US011557935B2

United States Patent
Sung et al.

(10) Patent No.: US 11,557,935 B2
(45) Date of Patent: Jan. 17, 2023

(54) STATOR OF ELECTRIC ROTATING MACHINE, HAIRPIN OF STATOR OF ELECTRIC ROTATING MACHINE AND MANUFACTURING METHOD THEREOF

(71) Applicant: LG Magna e-Powertrain Co., Ltd., Incheon (KR)

(72) Inventors: Wonjung Sung, Seoul (KR); Yangsoo Lee, Seoul (KR); Hojun Shin, Seoul (KR); Kyeonghwan Kim, Seoul (KR); Gyeongjae Park, Seoul (KR); Junho Ahn, Seoul (KR)

(73) Assignee: LG MAGNA E-POWERTRAIN CO., LTD., Incheon (KR)

( * ) Notice: Subject to any disclaimer, the term of this patent is extended or adjusted under 35 U.S.C. 154(b) by 606 days.

(21) Appl. No.: 16/539,053

(22) Filed: Aug. 13, 2019

(65) Prior Publication Data
US 2020/0212749 A1 Jul. 2, 2020

(30) Foreign Application Priority Data

Jan. 2, 2019 (KR) .................. 10-2019-0000369
Jan. 7, 2019 (KR) .................. 10-2019-0001830

(51) Int. Cl.
*H02K 3/40* (2006.01)
*H02K 1/16* (2006.01)
(Continued)

(52) U.S. Cl.
CPC .................. *H02K 3/40* (2013.01); *H02K 1/16* (2013.01); *H02K 3/12* (2013.01); *H02K 3/28* (2013.01);
(Continued)

(58) Field of Classification Search
CPC .. H02K 1/16; H02K 3/40; H02K 3/12; H02K 3/34; H02K 15/105; H02K 15/0421; H02K 3/28
(Continued)

(56) References Cited

U.S. PATENT DOCUMENTS

2003/0164656 A1 9/2003 Sakurai
2004/0000423 A1 1/2004 Emery
(Continued)

FOREIGN PATENT DOCUMENTS

CN 3675331 A1 * 6/2019 ............... H02K 3/12
FR 2918815 A1 1/2009
(Continued)

OTHER PUBLICATIONS

European Search Report received from the European Patent Office (EPO) in European Patent Application No. 19183807.7, dated Jan. 3, 2020 (9 pages).

*Primary Examiner* — Jianchun Qin
(74) *Attorney, Agent, or Firm* — Birch, Stewart, Kolasch & Birch, LLP

(57) ABSTRACT

The present disclosure provides a stator of an electric rotating machine, a hairpin of a stator of an electric rotating machine, and a manufacturing method thereof. The stator for the electric rotating machine comprises a stator core, and a stator coil comprising hairpins. Each hairpin comprises a conductor, a film surrounding the conductor, a pair of insertion parts configured to be inserted into different slots, and a connection part connecting the insertion parts. The connection part comprises first and second bending parts bent with a predetermined radius of curvature such that the pair of insertion parts are insertable into different layers. The hairpins include first and second hairpins, each of the first and second hairpins configured to protrude from one end of the stator core by different protrusion lengths. Each of the (Continued)

first and second hairpins comprises a region configured to cross each other.

11 Claims, 21 Drawing Sheets

(51) Int. Cl.
    *H02K 3/12*          (2006.01)
    *H02K 3/28*          (2006.01)
    *H02K 3/34*          (2006.01)
    *H02K 15/04*        (2006.01)
    *H02K 15/10*        (2006.01)

(52) U.S. Cl.
    CPC ........... *H02K 3/34* (2013.01); *H02K 15/0421* (2013.01); *H02K 15/105* (2013.01)

(58) Field of Classification Search
    USPC ....................................................... 310/196
    See application file for complete search history.

(56) References Cited

U.S. PATENT DOCUMENTS

| | | |
|---|---|---|
| 2007/0200448 A1 | 8/2007 | Oowatari et al. |
| 2016/0248291 A1 | 8/2016 | Tamura |
| 2018/0088168 A1 | 3/2018 | Dang |

FOREIGN PATENT DOCUMENTS

| | | |
|---|---|---|
| JP | 2012-143089 A | 7/2012 |
| KR | 10-2013-0028565 A | 3/2013 |
| KR | 10-2017-0066859 A | 6/2017 |

\* cited by examiner

STATOR OF ELECTRIC ROTATING MACHINE, HAIRPIN OF STATOR OF ELECTRIC ROTATING MACHINE AND MANUFACTURING METHOD THEREOF

CROSS-REFERENCE TO RELATED APPLICATION

This application claims priority under 35 U.S.C. § 119 to Korean Patent Application No. 10-2019-0000369, filed on Jan. 2, 2019, and Korean Patent Application No. 10-2019-0001830, filed on Jan. 7, 2019, the disclosures of which are hereby incorporated by reference in their entireties.

BACKGROUND

1. Technical Field

The present disclosure relates to a stator of an electric rotating machine, a hairpin of a stator of an electric rotating machine, and a manufacturing method thereof.

2. Background

As is well known, an electric rotating machine refers to a machine having a stator and a rotor rotatably provided to the stator.

Some of the electric rotating machines are composed of a generator that converts mechanical energy into electrical energy, and others are composed of a motor that converts electrical energy into mechanical energy. Others of the electric rotating machines may be configured to selectively function as a motor or a generator.

The stator of the electric rotating machine has a stator core including slots and teeth and a stator coil wound via the slots.

The stator of the electric rotating machine having an increasing ratio of a cross-section of a conductor of the stator coil to an internal area of the slot (i.e., a fill factor) is advantageous for increasing output power.

In consideration of this point, a stator coil formed by connecting a hairpin magnet wire (hereinafter referred to as "hairpin"), which is formed by bending a flat-type copper wire with a relatively large cross-sectional area of a conductor in a "U" shape, in a predetermined pattern is used for some stators.

FIG. 1 is a perspective view of a hairpin of a conventional electric rotating machine. As shown in FIG. 1, a hairpin 10 includes a pair of insertion parts 20 configured to be inserted into slots of a stator core and a connection part 30 connecting the insertion parts 20 to each other. A coated reinforced insulation part 40 is formed in a crossing region of the connection part 30 so that the thickness of an insulating material (film) may be increased compared to the periphery.

However, for each hairpin of a conventional electric rotating machine, a reinforced insulation part 40 should be formed in the crossing region of the hairpin 10. Hence, the manufacturing time of the hairpin 10 is increased, and the manufacturing cost thereof is also increased.

The pair of insertion parts 20 of each of the hairpins is inserted into different slots of the stator core, and the insertion parts 20 of the hairpins are radially placed apart from one another inside the slots of the stator core to form a layer.

The pairs of insertion parts of some of the hairpins are placed inside different slots in different layers. In this case, the connection part has a bending part that is bent with a predetermined curvature (a radius of curvature) so that the pair of insertion parts may be displaced in different layers.

However, for the stator of the conventional electric rotating machine, when the bending part is formed at the center of the connection part such that the pair of insertion parts of the hairpin 10 may be inserted into different layers of different slots, the bending part is bent with a relatively small radius of curvature. While the bending part with a relatively small radius of curvature is formed in the hairpin, the film of the bending part may be damaged. The damage causes the hairpin 10 to have a low partial discharge inception voltage (DDIV) and thus the dielectric strength of the hairpin 10 may be degraded.

In view of such a problem, for the stator of the conventional electric rotating machine, the curvature radius of the bending part at the center of the connection part should be relatively large so that the damage of the film can be suppressed during the bending operation at the center of the connection part of the hairpin. Hence, spring back and the like cause the bending operation to require relatively much time and effort.

Also, the bending part at the center of the connection part of the hairpin 10 is a region where the hairpin 10 is cross-coupled to another hairpin, and such bending parts are horizontally spaced apart from one another. Thus, the hairpins are interfered with each other, thus requiring relatively much time and effort for the assembly.

In particular, a partial discharge may occur even at a relatively low voltage in a crossing region of the hairpin 10 connected to different phases of a power source, that is, in an inter-phase crossing region of the hairpin.

In view of such a problem, a stator of a rotating electrical machine capable of preventing electrical contact or arcing between adjacent portions of a hairpin by inserting an insulator between the adjacent portions of the hairpin has been disclosed in U.S. Patent Publication NO. US2004/0000423A1.

However, for the stator of the conventional electric rotating machine, an insulator is inserted between all of the adjacent portions of the hairpin. Hence, the manufacturing cost of the insulator is added, and thus, the manufacturing cost of the stator of the electric rotating machine is increased.

The insulator is configured by bending a planar insulating member according to the shape of the adjacent region of the hairpin and forming a bending part corresponding to the shape of the adjacent region of the hairpin. Hence, the insulator is complicated in configuration and is not easy to manufacture.

Also, the bending part should be bent upward or downward depending on the shape of the hairpin after a portion of the insulator may be inserted between the adjacent portions of the hairpin. Hence, much cost and effort are required for coupling the hairpin to the insulator, and productivity is degraded.

PRIOR ART DOCUMENT

Patent Document (Patent Document 1) US20040000423 A1

SUMMARY

Therefore, an aspect of the disclosure is to provide a stator of an electric rotating machine, the stator being capable of improving insulation performance of an inter-phase crossing region of a stator coil.

Also, the present disclosure provides a stator of an electric rotating machine, the stator being capable of suppressing adverse effects due to the damage of the film when the hairpin is bent.

Also, the present disclosure provides a stator of an electric rotating machine, the stator being capable of facilitating bending of the hairpin.

Also, the present disclosure provides a stator of an electric rotating machine, the stator being capable of facilitating insertion of the hairpin into the slot.

Also, the present disclosure provides a hairpin of a stator of an electric rotating machine, the hairpin being capable of improving insulation performance, and a manufacturing method thereof.

Also, the present disclosure provides a hairpin of a stator of an electric rotating machine, the hairpin being capable of improving insulation performance by coating an insulating liquid to the bending part of the hairpin, and a manufacturing method thereof.

To achieve these and other advantages and in accordance with the purpose of this specification, as embodied and broadly described herein, there is provided a stator of an electric rotating machine, the stator comprising a stator core comprising slots and teeth, and a stator coil comprising a plurality of hairpins configured to be inserted into the slots of the stator core in a predetermined pattern, each of the plurality of hairpins comprising a conductor with a rectangular cross section and a film (or dry paint film, paint film) surrounding the conductor. Each of the plurality of hairpins comprises a pair of insertion parts configured to be inserted into different slots and a connection part connecting the insertion parts. The connection part comprises a first bending part and a second bending part, the first and second bending parts being bent with a predetermined radius of curvature so that the pair of insertion parts are radially insertable into different layers inside the slots. The plurality of hairpins include a first hairpin and a second hairpin, the first and second hairpins being configured to protrude from one end of the stator core by different protrusion lengths, and each of the first and second hairpins comprising a region configured to cross each other.

According to an embodiment of the present disclosure, each of the first and second hairpins may comprise a first insertion part, the first insertion part of the first hairpin being configured to be inserted into a second layer of a corresponding one of the slots, and the first insertion part of the second hairpin being configured to be inserted into a third layer of a slot adjacent to one side of the slot into which the first insertion part of the first hairpin is configured to be inserted. Each of the first and second hairpins may also comprise a second insertion part, the second insertion part of the first hairpin being configured to be inserted into a fourth layer of another slot, and the second insertion part of the second hairpin being configured to be inserted into a fifth layer of a slot adjacent to one side of the slot into which the second insertion part of the first hairpin in configured to be inserted.

According to an embodiment of the present disclosure, each of the plurality of hairpins may comprise a rectangular cross section, and the radius of curvature of each of the first and second bending parts may be smaller than a maximum width of a cross section of the plurality of hairpins.

According to an embodiment of the present disclosure, a protrusion length of the first hairpin may be longer than a protrusion length of the second hairpin.

According to an embodiment of the present disclosure, each of the first hairpin and the second hairpin may comprise a first connection section connecting the first insertion part of the first hairpin and the first insertion part of the second hairpin to the first bending part, and a second connection section connecting the second insertion part of the first hairpin and the second insertion part of the second hairpin to the second bending part. The first bending part and the second bending part of the first hairpin may be disposed on one side of the first connection section of the second hairpin.

According to an embodiment of the present disclosure, a boundary region between the first bending part and the second bending part of the second hairpin may be configured to partially overlap with a boundary region between the first bending part and the second bending part of the first hairpin along the circumferential direction of the stator core.

According to an embodiment of the present disclosure, the first bending part and the second bending part of the first hairpin may be spaced a predetermined distance apart from the first bending part and the second bending part of the second hairpin.

According to an embodiment of the present disclosure, the plurality of hairpins may comprise a rectangular cross section, and the separation distance may be greater than a maximum width of a cross section of the hairpins.

According to an embodiment of the present disclosure, the plurality of hairpins may further include a third hairpin comprising a first insertion part and a second insertion part, the first and second insertion parts of the third hairpin being configured to be inserted into a first layer of different slots.

According to an embodiment of the present disclosure, a protrusion length of the third hairpin is longer than the protrusion length of the first hairpin and shorter than the protrusion length of the second hairpin.

According to an embodiment of the present disclosure, the plurality of hairpins may further include a fourth hairpin having a first insertion part and a second insertion part, the first and second insertion parts of the fourth pain being configured to be inserted into a sixth layer of different slots. A protrusion length of the fourth hairpin is longer than the protrusion length of the first hairpin and shorter than the protrusion length of the second hairpin.

According to an embodiment of the present disclosure, the first insertion part and the second insertion part of each of the first hairpin, the second hairpin, and the third hairpin may comprise an interval equal to a 6-slot pitch, and the first insertion part and the second insertion part of the fourth hairpin may comprise an interval equal to a 7-slot pitch.

According to an embodiment of the present disclosure, the plurality of hairpins may further include a fifth hairpin disposed on an inner side of the fourth hairpin, and the fifth hairpin may comprise a first insertion part and a second insertion part, the first and second insertion parts of the fifth hairpin being configured to be inserted into a sixth layer of different slots.

According to an embodiment of the present disclosure, the first insertion part and the second insertion part of the fifth hairpin may comprise an interval equal to a 5-slot pitch.

According to an embodiment of the present disclosure, the stator coil may have phase-specific coil parts corresponding to phases of a power source, and each of the phase-specific coil part may have the first hairpin, the second hairpin, the third hairpin, the fourth hairpin, and the fifth hairpin.

There is also provided a method of manufacturing a hairpin of a stator of an electric rotating machine, the stator comprising a stator core comprising slots and teeth, and a stator coil comprising a plurality of hairpins configured to be inserted into the slots in a predetermined pattern. The method comprises cutting a winding, forming a hairpin comprising a pair of insertion parts and a connection part connecting the insertion parts using the winding, and coating the connection part with an insulating liquid.

According to an embodiment of the present invention, the connection part may be placed in a coating bath containing an insulating liquid to coat the connection part. A height of the insulating liquid in the coating bath may be greater than a height of the connection part when the connection part is immersed in the insulating liquid.

According to an embodiment of the present disclosure, the height of the insulating liquid in the coating bath may be less than or equal to a length of an end coil in the axial direction of the stator core.

According to an embodiment of the present disclosure, the insulating liquid may be a soft synthetic resin.

According to an embodiment of the present disclosure, the soft synthetic resin may comprise at least one of an epoxy resin, a Teflon resin, a fluoro resin, a polyethylene resin, a polypropylene resin, a nylon resin, and a polyvinyl chloride resin.

There is also provided a hairpin of a stator of an electric rotating machine, the stator comprising a stator core comprising slots and teeth, and a stator coil comprising a plurality of hairpins configured to be inserted into the slots in a predetermined pattern. The hairpin may comprise a pair of insertion parts configured to be inserted into different slots and a connection part connecting the insertion parts, a conductor, a film surrounding a surface of the conductor, and a coated part formed by coating circumference of the connection part with an insulating material.

According to an embodiment of the present invention, the coated part may comprise an outer surface of a boundary region between the connection part and the pair of insertion parts.

As described above, according to an embodiment of the present disclosure, by providing a first hairpin and a second hairpin which have different protrusion lengths from one end of a stator core, the first hairpin and the second hairpin having regions disposed to cross each other, it is possible to improve insulation performance of the inter-phase crossing region of the stator core.

Also, by spacing a first bending part and a second bending part, which are formed with a minimum radius of curvature of the first hairpin and the second hairpin, a predetermined distance apart from each other, it is possible to suppress adverse influences such as partial discharge caused by damage to films of the first bending part and the second bending part.

Also, by placing the first bending part and the second bending part, which are formed with a minimum radius of curvature of the first hairpin and the second hairpin, such that the two part are not in contact with each other, it is possible to minimize the minimum radius of curvature of the first bending part and the second bending part, thus quickly and easily performing an operation of bending the first hairpin and the second hairpin.

Also, by placing the first bending part and the second bending part, which have the minimum radius of curvature of the first hairpin and the second hairpin, a predetermined distance apart from each other, it is possible to suppress mutual interference, thereby quickly and easily performing an operation of inserting hairpins into slots.

Also, it is possible to exclude the use of a separate insulator to be inserted into the crossing region between the first hairpin and the second hairpin, and thus there is no fear that an increase in cost due to the insertion of the insulator will be caused.

Also, since it is possible to exclude the use of a separate insulator to be inserted into the crossing region between the first hairpin and the second hairpin, it is possible to quickly and easily perform the operation of inserting the hairpins into the slots, thus improving productivity.

Also, by additionally coating a bending part of the hair pin with an insulating liquid, it is possible to supplement a damaged film of the bending part generated during the bending process of the hair pin, thus preventing degradation of insulation performance of the hairpin.

Also, since the bending part of the hair pin is additionally coated, the thickness of the film of the bending part increases. As a result, it is possible to secure a separation distance between hairpins, thus prevent an initial voltage for partial discharge from being lowered.

Also, by setting the height of the insulating liquid in the coating bath to be greater than or equal to the height of the bending part (the connection part), it is possible to sufficiently coat the entirety of the bending part (connection part) with an insulating liquid.

Also, by setting the height of the insulating liquid in the coating bath to be less than or equal to the length of an end coil (the protrusion length of the hairpin), it is possible to minimize disturbance due to the thickness of the film when the hairpin is inserted into the slot of the stator core even though the thickness of the film is increased due to the additional film of the hairpin.

DETAILED DESCRIPTION OF THE INVENTION

Figure 1:
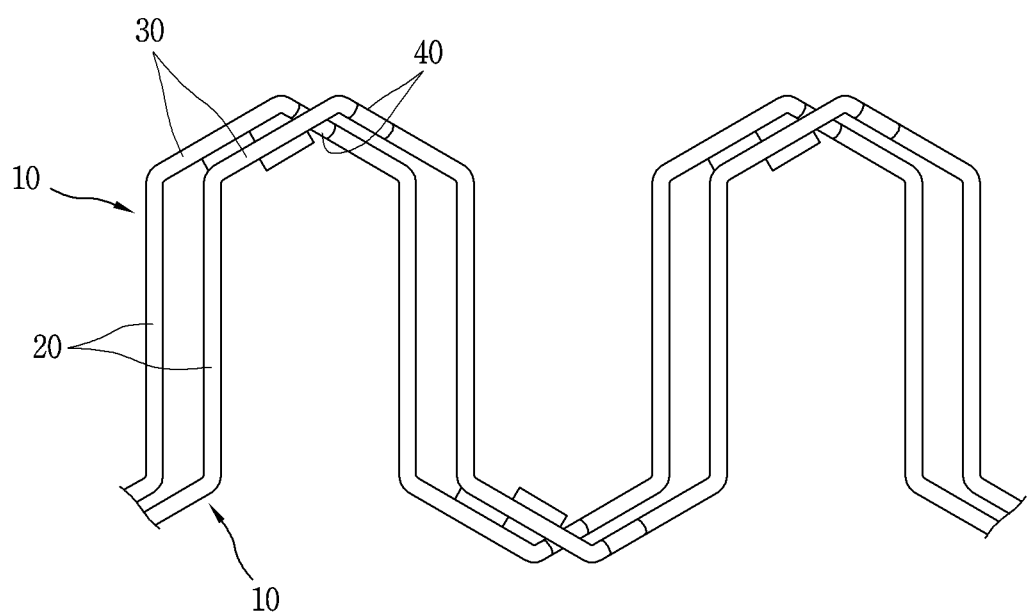
FIG. 1 is a perspective view showing a hairpin included in a conventional electric rotating machine (motor).

Hereinafter, embodiments of the present disclosure will be described in detail with reference to the accompanying drawings. Herein, like reference numerals denote like elements even in different embodiments, and a description for an element appearing first will replace descriptions for like elements appearing later. As used herein, the singular forms "a," "an," and "the" are intended to include the plural forms as well unless the context clearly indicates otherwise. In describing embodiments disclosed in the specification, moreover, the detailed description will be omitted when a specific description for publicly known technologies to which the invention pertains is judged to obscure the gist of the embodiments disclosed in the specification. Also, it should be noted that the accompanying drawings are merely illustrated to easily understand the embodiments disclosed in the specification, and therefore, they should not be construed to limit the technical spirit disclosed in the specification.

Figure 2:
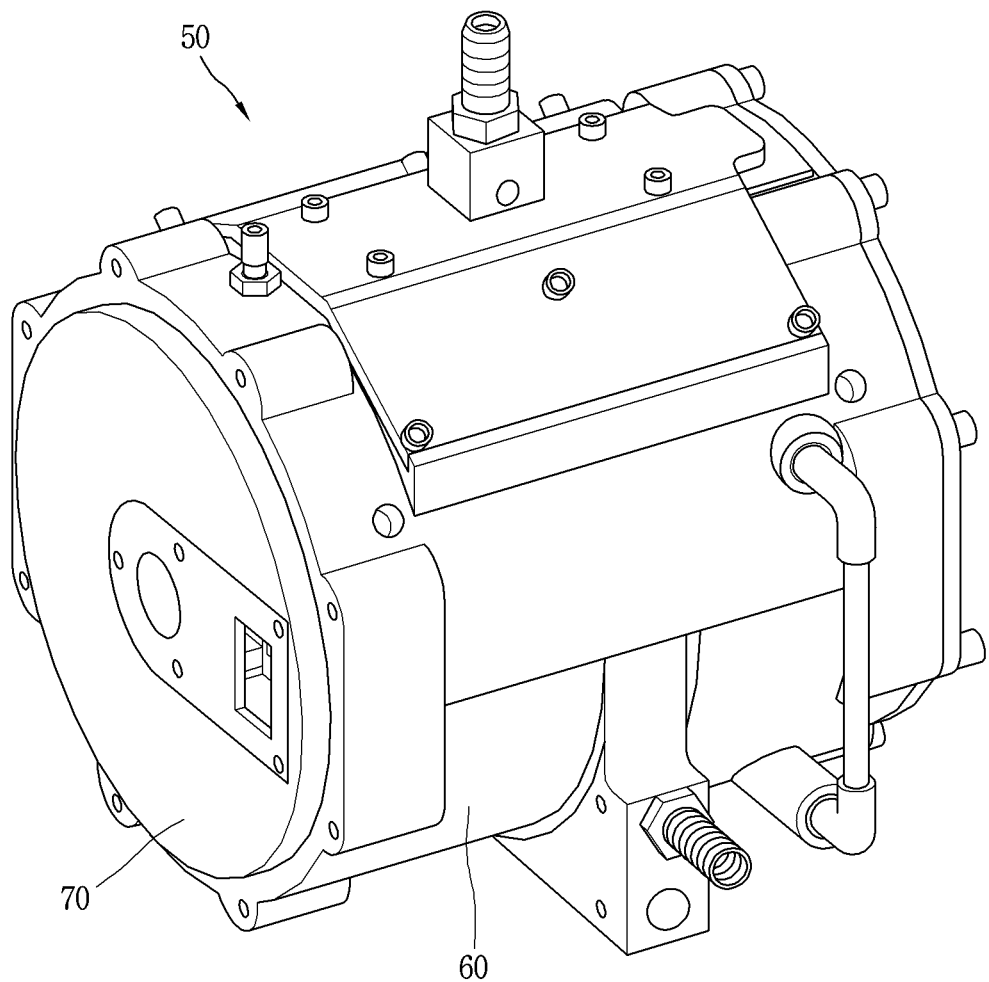
FIG. 2 is a perspective view of an electric rotating machine (motor) having a hairpin according to an embodiment of the present disclosure.
Figure 3:
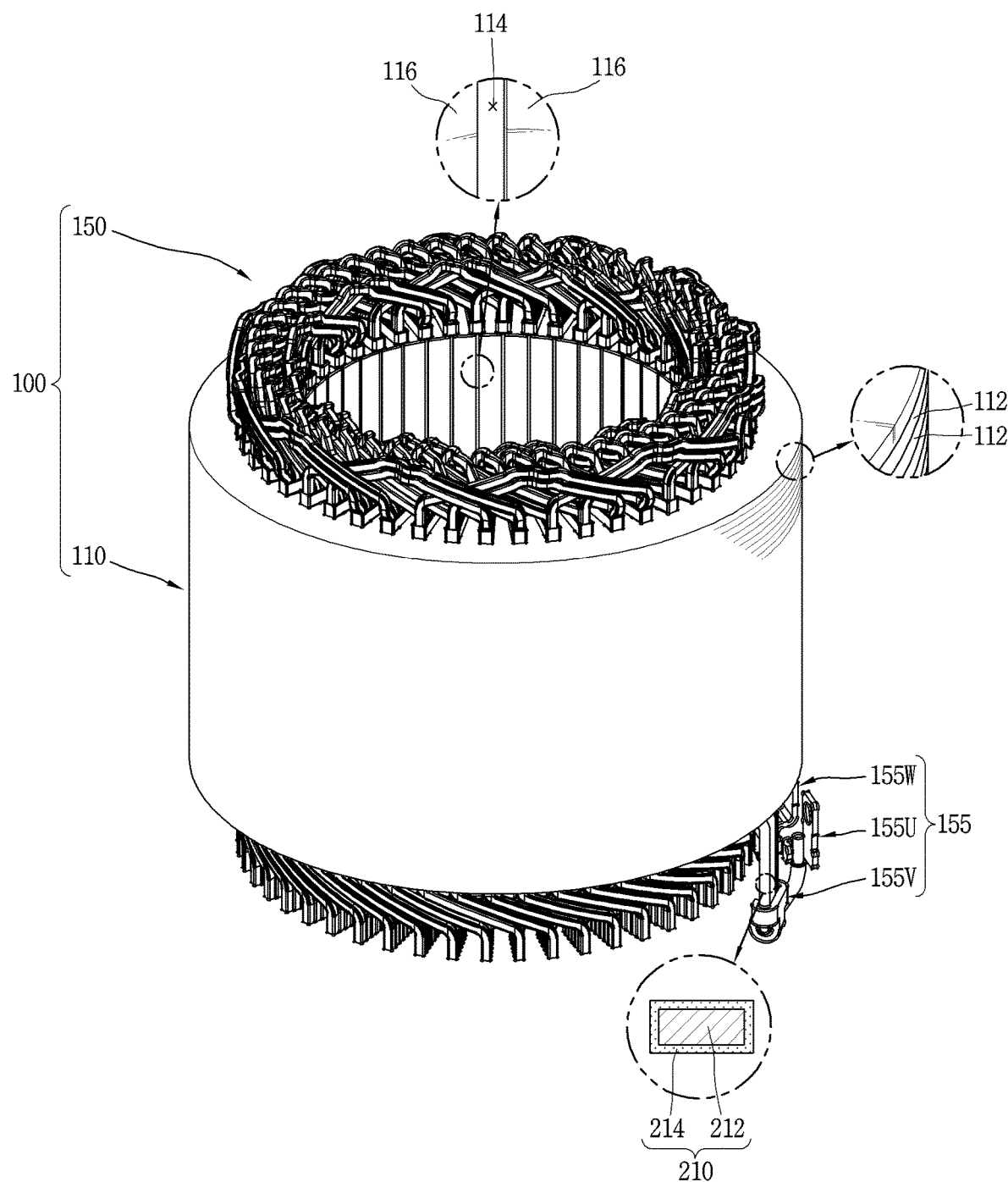
FIG. 3 is a perspective view of a stator of an electric rotating machine according to an embodiment of the present disclosure.
Figure 4:
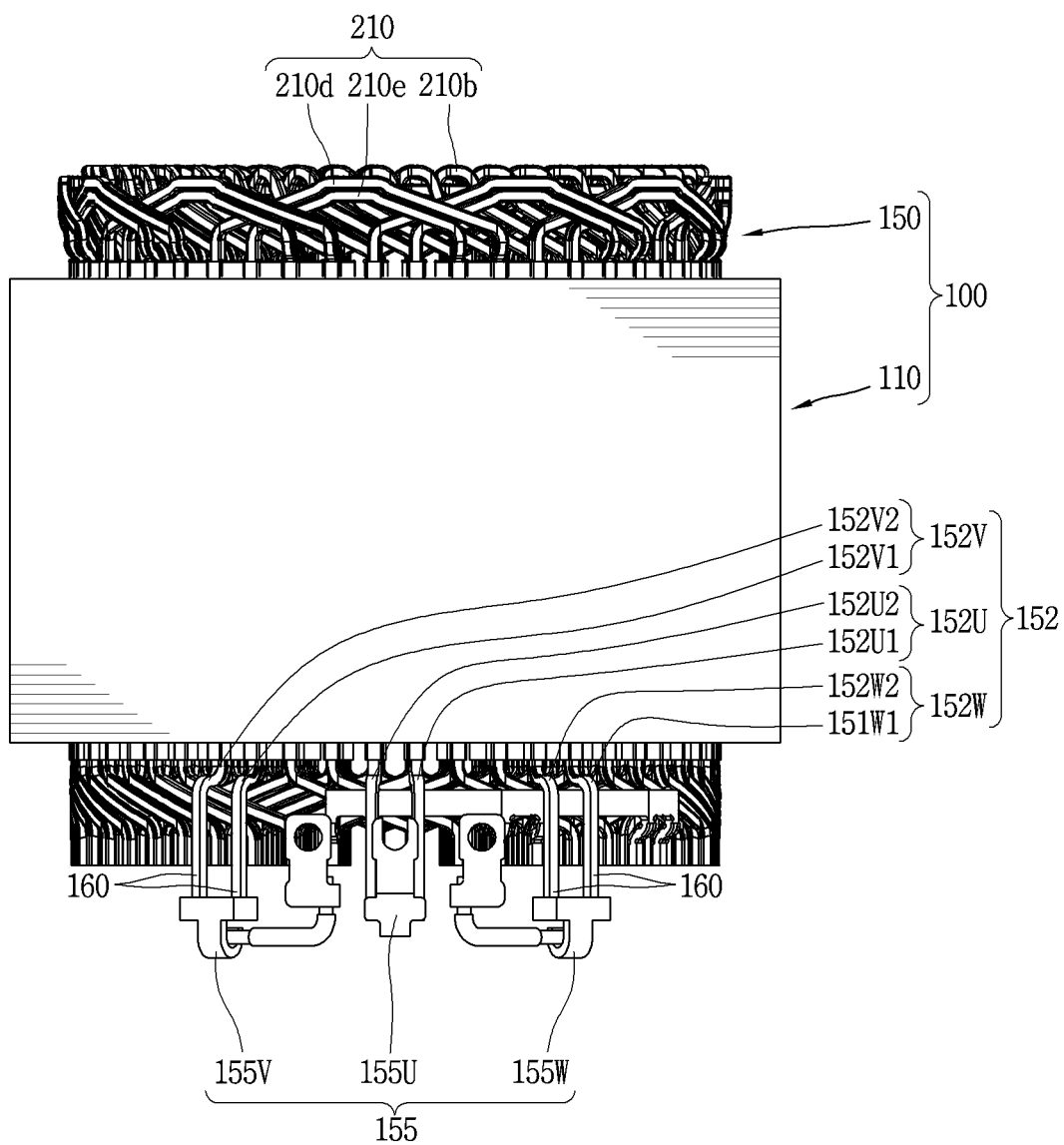
FIG. 4 is a front view of the stator of FIG. 3.
Figure 5:
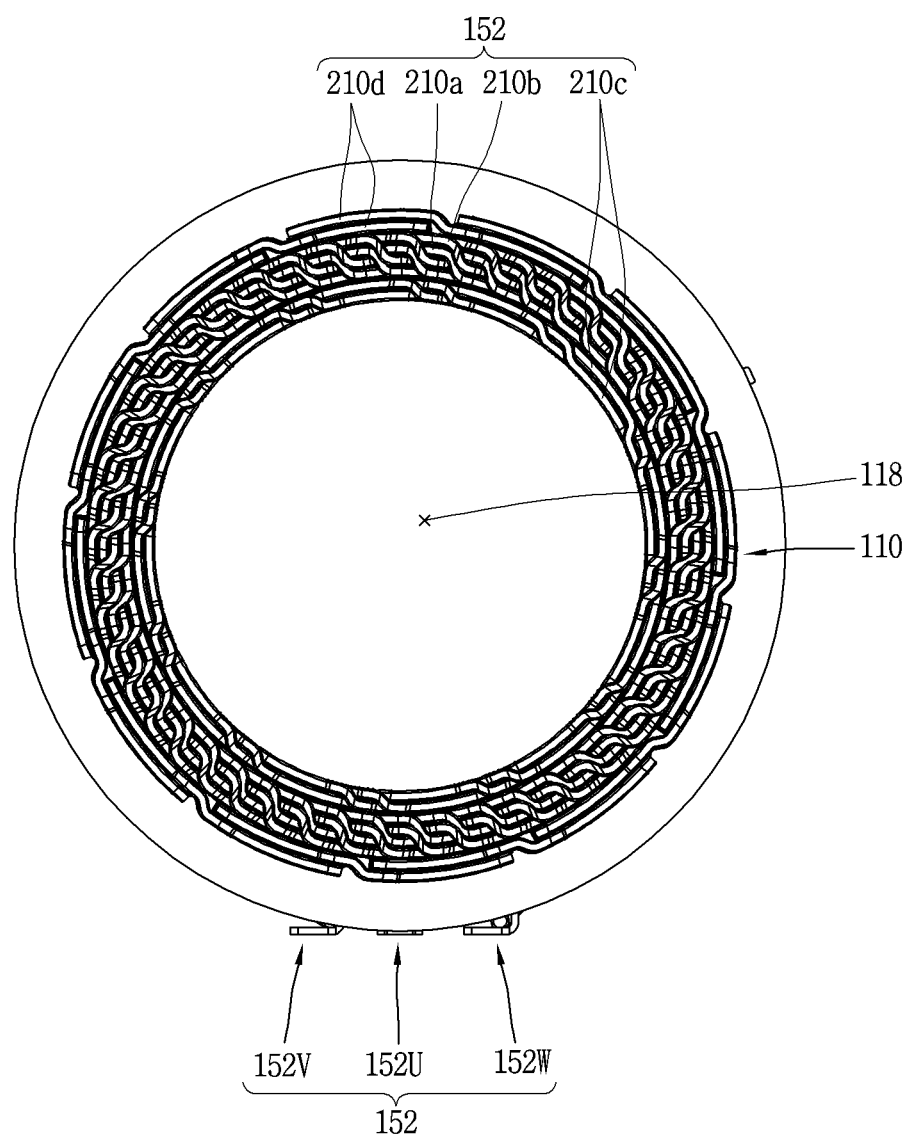
FIG. 5 is a plan view of the stator of FIG. 3.
Figure 6:
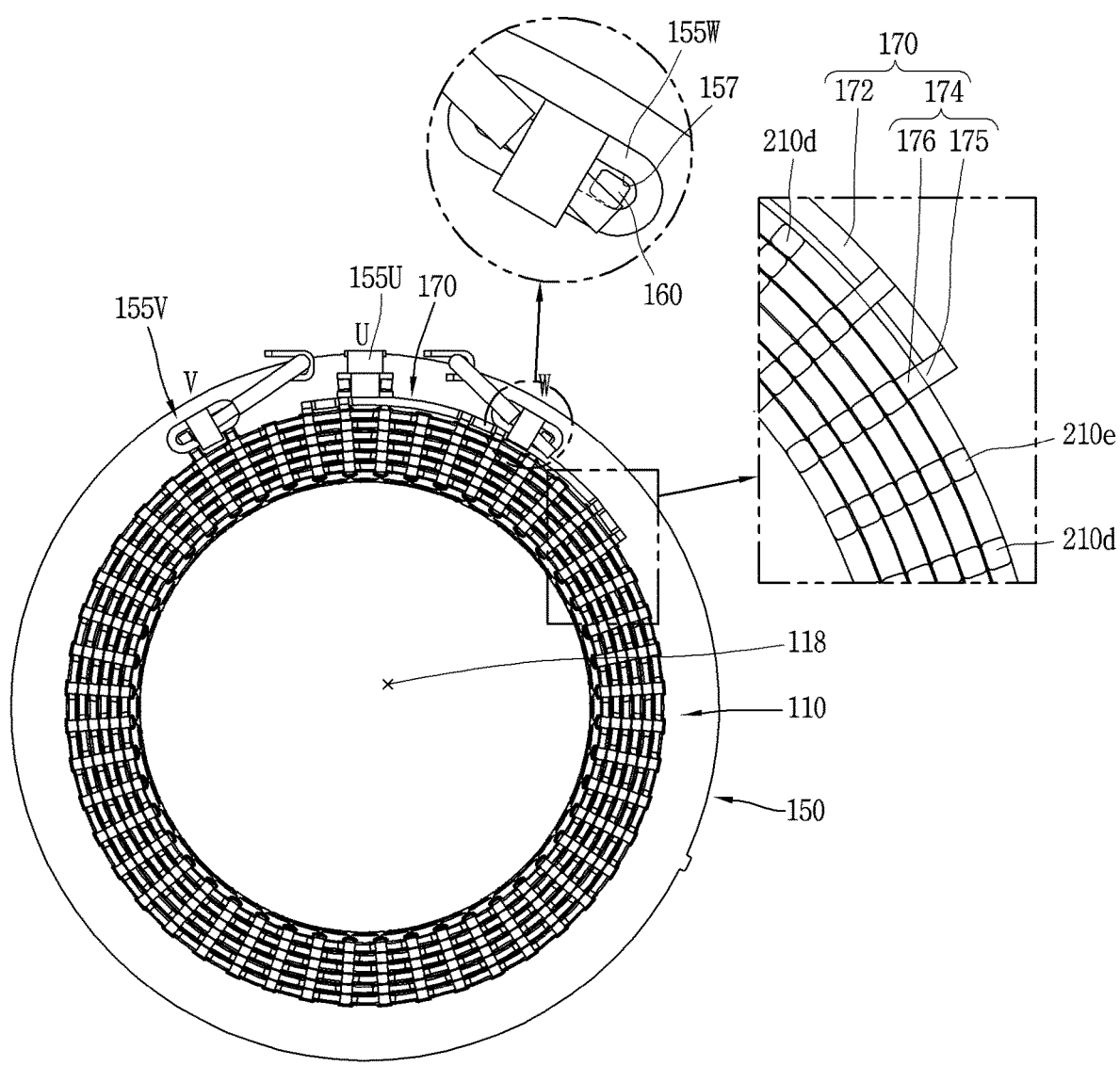
FIG. 6 is a bottom view of the stator of FIG. 3.
Figure 7:
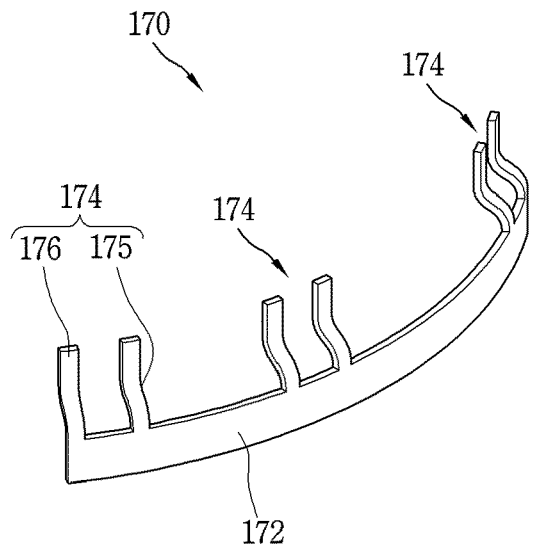
FIG. 7 is a perspective view of a neutral line of FIG. 6.

FIG. 2 is a perspective view of an electric rotating machine (motor) having a hairpin according to an embodiment of the present disclosure, FIG. 3 is a perspective view of a stator of an electric rotating machine according to an embodiment of the present disclosure, FIG. 4 is a front view of the stator of FIG. 3, FIG. 5 is a plan view of the stator of FIG. 3, FIG. 6 is a bottom view of the stator of FIG. 3, and FIG. 7 is a perspective view of a neutral line of FIG. 6. As shown in FIG. 2, an electric rotating machine 50 having a hairpin according to an embodiment of the present disclosure includes a housing 60, a stator 100, and a rotor (not shown). An accommodation space is formed inside the housing 60. The housing 60 may be open on both sides. A housing cover 70 may be detachably coupled to both ends of the housing 60. The housing 60 may be made of, for example, a metal member with excellent thermal conductivity. The housing 60 may be made of, for example, aluminum (Al). For example, the housing cover 70 may be implemented in the shape of a cylinder with one open side. The housing cover 70 is coupled to the housing such that the open area blocks one end of the housing 60.

As shown in FIGS. 3 to 6, the stator 100 according to an embodiment of the present disclosure includes a stator core 110 and a stator coil 150 wound around the stator core 110.

The stator core 110 includes slots 114 and teeth 116. A rotor accommodation hole 118 capable of rotatably accommodating a rotor (not shown) therein is formed to pass through the stator core 110. The stator core 110 may be formed by, for example, stacking and insulating electrical steel sheets 112. Each stator core 110 may include the slots 114, the teeth 116, and the rotor accommodation hole 118. For example, the slots 114 and the teeth 116 may be alternately formed around the circumference of the stator core 110. In this embodiment, the number of the slots 114 and the number of the teeth 116 are all 48, but this is just an example, and the numbers may be appropriately adjusted.

The stator coil 150 is formed by connecting a plurality of hairpins (hairpin magnet wires) 210 capable of being inserted into the slots 114 in a predetermined pattern. For example, such a hairpin 210 may be formed by cutting a flat-type copper wire or a rectangular copper wire to a predetermined length and bending the cut wire in a roughly "U" shape or a hairpin shape. The hairpin 210 has a rectangular section. In this embodiment, for example, the hairpin 210 has a width (for example, a maximum width) of 3.24 mm and a thickness (width) of 2.84 mm. However, this is just an example, and the size of the hairpin 210 may be appropriately regulated.

For example, the hairpin 210 has a conductor 212 with a quadrangular section and a film (or dry paint film, paint film) 214 surrounding the conductor 212. The film 214 is made of an insulating material to insulate the conductor 212. The hairpin 210 has a pair of insertion parts 220 configured to be inserted into the slots 114 of the stator core 110 and a connection part configured to connect the insertion parts 220. For example, the film 214 may have a thickness of 0.04 mm to 0.05 mm.

The stator coil 150 has a plurality of phase-specific coil parts 152 connected to phases (a u-phase, a v-phase, and a w-phase) of a power source. In detail, the stator coil 150 has a u-phase coil part 152U connected to the u-phase of the power source, a v-phase coil part 152V connected to the v-phase of the power source, and a w-phase coil part 152W connected to the w-phase of the power source. The u-phase coil part 152U, the v-phase coil part 152V, and the w-phase coil part 152W are spaced apart from one another at certain slot pitches around the circumference of the stator core 110. Each of the phase-specific coil parts 152 has a first phase-specific coil part and a second phase-specific coil part which are connected in parallel to each other. In detail, the u-phase coil part 152U has a first u-phase coil part 152U1 and a second u-phase coil part 152U2. The v-phase coil part 152V has a first v-phase coil part 152V1 and a second v-phase coil part 152V2. The w-phase coil part 152W has a first w-phase coil part 152W1 and a second w-phase coil part 152W2. Here, the first phase-specific coil part and the second phase-specific coil part are formed by connecting hairpins 210 inserted into consecutive slots 114 of the stator core 110 in a predetermined pattern.

In detail, for example, when a first insertion part 221 of a first hairpin 210 of the first u-phase coil part 152U1 is inserted into a first slot, a first insertion part 221 of a first hairpin 210 of the second u-phase coil part 152U2 is placed in a second slot, for example. For example, a first insertion part 221 of a first hairpin 210 of the first v-phase coil part 152V1 may be placed in a fifth slot spaced apart at a pitch of 4 slots from the first hairpin 210 of the first u-phase coil part 152U1. A first insertion part 221 of a first hairpin 210 of the second v-phase coil part 152V2 may be placed in a sixth slot. Also, a first insertion part 221 of a first hairpin 210 of the first w-phase coil part 152W1 may be placed in a forty-fifth slot, and a first insertion part 221 of a first hairpin 210 of the second w-phase coil part 152W2 may be placed in a forty-sixth slot.

The stator coil 150 has power input parts 155 connected to ends of the phase-specific coil parts 152 so that power may be input to the phase-specific coil parts 152. Connection conductors 160 protruding axially to connect to the power input parts 155 are provided at one ends of the first hairpins 210 of the phase-specific coil parts 152.

The power input parts 155 include a u-phase power input part 155U connected to the end of the u-phase coil part 152U, a v-phase power input part 155V connected to the end of the v-phase coil part 152V, and a w-phase power input part 155W connected to the w-phase coil part 152W. The power input parts 155 have insertion holes 157 to which the ends of the connection conductors 160 are to be inserted.

The other ends of the phase-specific coil parts 152 are connected to a neutral line 170 (see FIGS. 4 and 6). As shown in FIG. 7, the neutral line 170 has a circular-arc-shaped body 172 and phase-specific connections 174 protruding from the body 172 and connecting to the ends of the phase-specific coil parts. In order to connect to the ends of the phase-specific coil parts 152, each of the phase-specific connections 174 may have a horizontal section 175 horizontally bent toward the center of the stator core 110 and a vertical section 176 bent at the horizontal section 175 and axially placed. The phase-specific connections 174 are connected to distal ends placed in fifth layers of the slots 114 of the phase-specific coil parts 152. As enlarged and shown in FIG. 4, no hairpins 210 are placed in sixth layers of the slots 114 in which the horizontal sections 175 of the phase-specific connections 174 of the neutral line 170 are to be placed. A fourth hairpin 210d and a fifth hairpin 210e, which will be described below, are placed on both sides of the horizontal section 175 of each of the phase-specific connections 174 of the neutral line 170.

Figure 8:
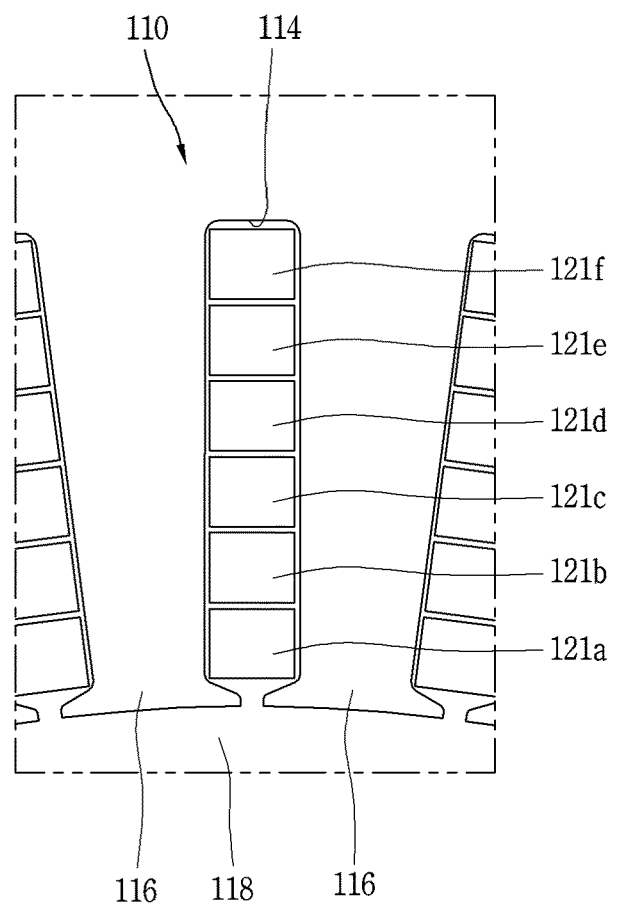
FIG. 8 is a diagram illustrating a hairpin of the stator of FIG. 3 inserted into a slot.

FIG. 8 is a diagram illustrating a hairpin of the stator of FIG. 3 inserted into a slot. As shown in FIG. 8, a pair of insertion parts 200 of the hairpin 210 is inserted into different slots 114 of the stator core 110. The insertion parts 220 of such hairpins 210 form a plurality of layers radially spaced apart from one another inside the slots 114. Here, the innermost layer of the slots 114 of the stator core 110 is a first layer 121a, and the radially outermost layer is a sixth layer 121f. In this embodiment, the first layer 121a to the sixth layer 121f are formed inside the slots 114 of the stator core 110. However, this is just an example, and the number of layers may be appropriately adjusted.

The hairpin 210 includes a first hairpin 210a, a second hairpin 210b, a third hairpin 210c, a fourth hairpin 210d, and a fifth hairpin 210e which are roughly similar in appearance but are formed to have different shapes according to their insertion positions.

The hairpins will be described below with reference to FIGS. 9A-9C to 13A-13C.

Figures 9A, 9B, 9C:
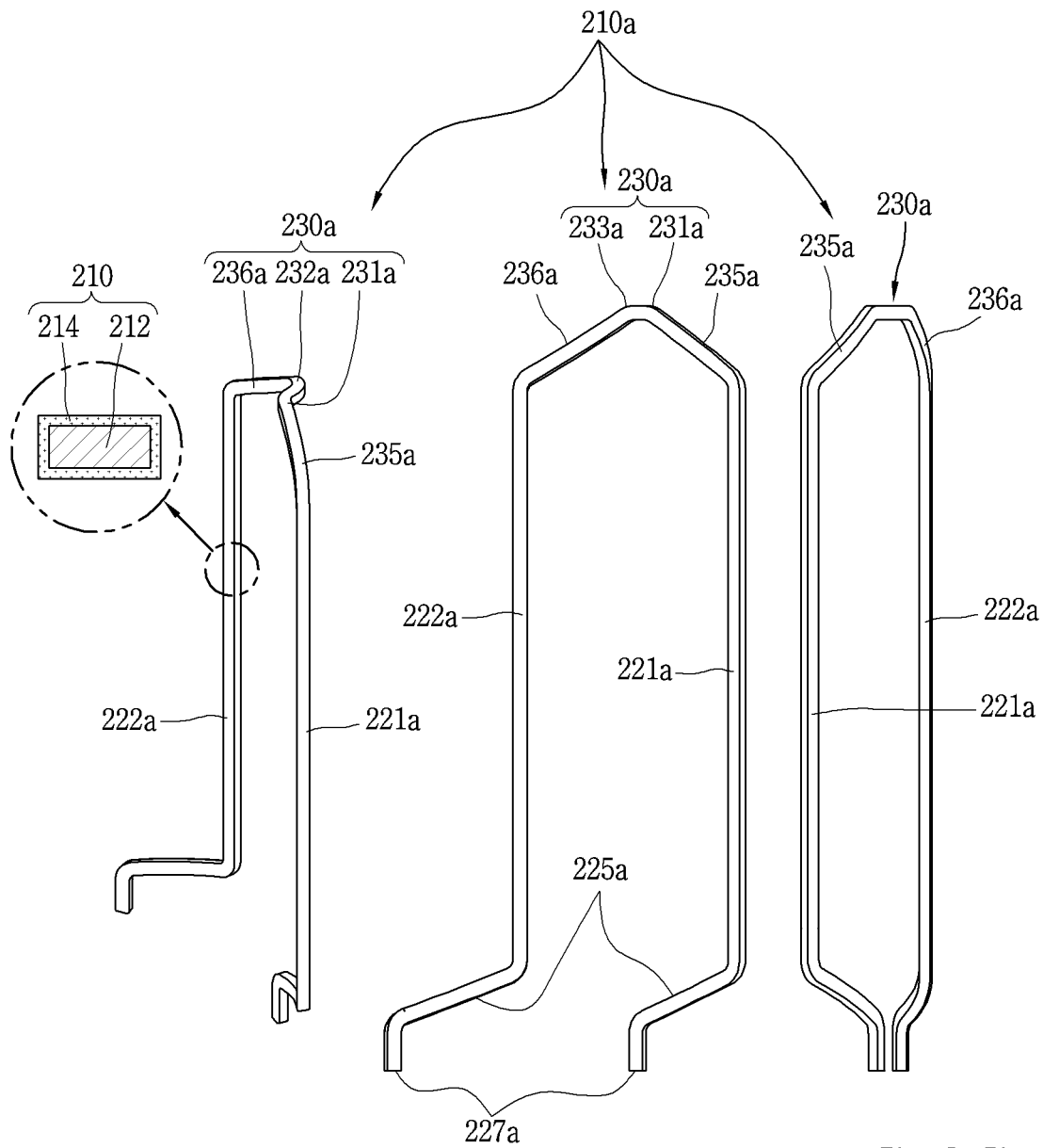
FIG. 9A is a perspective view of a first hairpin of FIG. 3.
FIG. 9B is another perspective view of the first hairpin of FIG. 3.
FIG. 9C is another perspective view of the first hairpin of FIG. 3.

FIGS. 9A-9C are perspective views of the first hairpin of FIG. 3, FIGS. 10A-10C are perspective views of the second hairpin of FIG. 3, FIGS. 11A-11C are perspective views of the third hairpin of FIG. 3, FIGS. 12A-12C are perspective views of the fourth hairpin of FIG. 3, and FIGS. 13A-13C are perspective views of the fifth hairpin of FIG. 3. Each of FIGS. 9A-9C to 13A-13C illustrate perspective views of a corresponding hairpin in different directions.

As shown in FIGS. 9A-9C, the first hairpin 210a is implemented in a roughly reverse "U" shape by including a pair of insertion parts capable of being inserted into different slots 114 and a connection part 230a for connecting the insertion parts. The connection part 230a includes a first bending part 231a and a second bending part 233a.

The pair of insertion parts have a first insertion part 221a and a second insertion part 222a spaced a predetermined distance apart from the first insertion part 221a. The first insertion part 221a and the second insertion part 222a are spaced apart from each other at a pitch of 6 slots. In detail, when the first insertion part 221a is inserted into any one of the slots 114 of the stator core 110, the second insertion part 222a is inserted into a sixth slot 114 circumferentially from the slot 114 into which the first insertion part 221a is inserted. That is, when the first insertion part 221a is inserted into a first slot, the second insertion part 222a is inserted into a seventh slot. In this embodiment, the first insertion part 222a of the first hairpin 210a is placed in a second layer 121b inside the first slot, and the second insertion part 222a is placed in a fourth layer 121d inside the seventh slot.

The insertion part 220 of the hairpin 210 has a length sufficient to protrude from the end of the stator core 110 after being inserted into the slot 114 of the stator core 110. A slope extending part 225 obliquely extending to one side (to the left or the right in the drawing) around the circumference of the stator core 110 after the insertion part 220 is inserted into the slot 114 is formed at the end of the insertion part 220. A connection end portion 227 axially extending and connecting to other hairpins 210 or the like through welding or the like is formed at a distal end of the slope extending part 225. The connection end portion 227 is bent and then placed toward the shaft of the stator core 110. In the description of the hairpin 210, the insertion part 220 includes insertion parts of the first hairpin 210a, the second hairpin 210b, the third hairpin 210c, the fourth hairpin 210d, and the fifth hairpin 210e. Likewise, the slope extending part 225 includes slope extending parts 225a, 225b, 225c, 225d, and 225e of the first hairpin 210a, the second hairpin 210b, the third hairpin 210c, the fourth hairpin 210d, and the fifth hairpin 210e, and the connection end portion 227 includes connection end portions 227a, 227b, 227c, 227d, and 227e of the first hairpin 210a, the second hairpin 210b, the third hairpin 210c, the fourth hairpin 210d, and the fifth hairpin 210e.

The connection part 230 of the hairpin 210 includes a first bending part 231 and a second bending part 232 which are bent with a predetermined minimum radius of curvature so that the pair of insertion parts 220 may be radially inserted into different layers inside the slot 114 The first hairpin 210a includes a first connection section 235a for connecting the first insertion part 221a and the first bending part 231a and a second connection section 236a for connecting the second insertion part 222a and the second bending part 232a.

The first bending part 231a and the second bending part 232a of the first hairpin 210a have the minimum radius of curvature. The minimum radius of curvature of the first bending part 231a and the second bending part 232a is smaller than the width (the maximum width) of the cross section of the hairpin 210. For example, the minimum radius of curvature of the first hairpin 210a is implemented to range from 2 mm to 3 mm. Accordingly, the first bending part 231a and the second bending part 232a of the first hairpin 210a are bent with the minimum radius of curvature which is significantly small compared to the conventional technique, and thus have a relatively large degree of elastic deformation. Therefore, it is possible to suppress spring-back or the like. Accordingly, it is possible to quickly and easily perform the bending operation of the first bending part 231a and the second bending part 232a. As shown in FIG. 9B, a first connection section 235a is formed by bending an upper end of the first insertion part 221a upward to the left in the drawing. As shown in FIG. 9A, the first bending part 231a is bent with the minimum radius of curvature from the first connection section 235a to the right in the drawing, and the first bending part 231a is bent at one end with the minimum radius of curvature to the left in the drawing and then bent downward in the drawing to form the second connection section 236a. The second connection section 236a is bent downward at one end and then connected to the second insertion part 222a.

Figure 14:
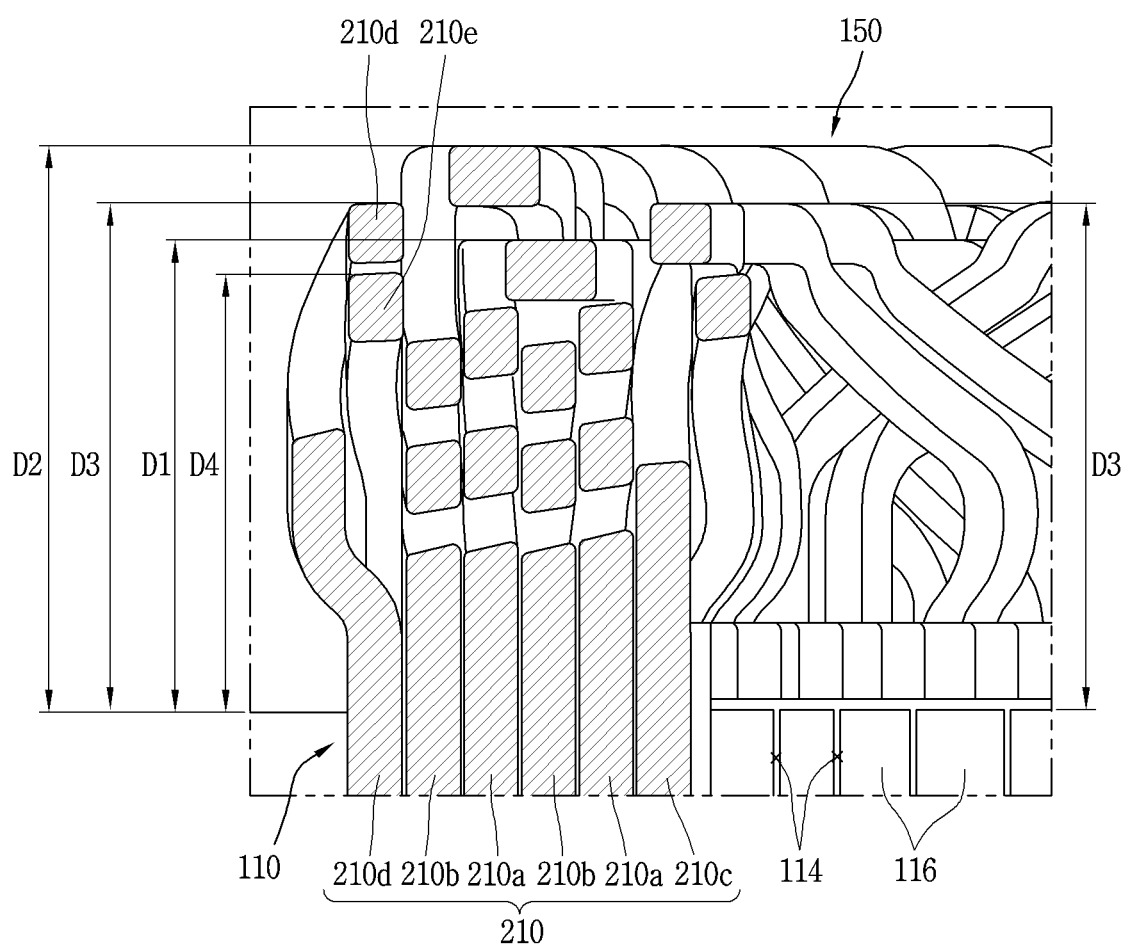
FIG. 14 is a sectional view of a region where the first hairpin and the second hairpin of FIG. 3 cross each other.

The first hairpin 210a has a predetermined first protrusion length D1 from the end of the stator core 110 (see FIG. 14). The first hairpin 210a is configured to have a first protrusion length D1 axially from the end of the stator core 110 after the first hairpin 210a is inserted into, and coupled to, the stator core 110. For example, the first protrusion length D1 may be of 24 mm to 26 mm or, in some embodiments, 25 mm.

Figures 10A, 10B, 10C:
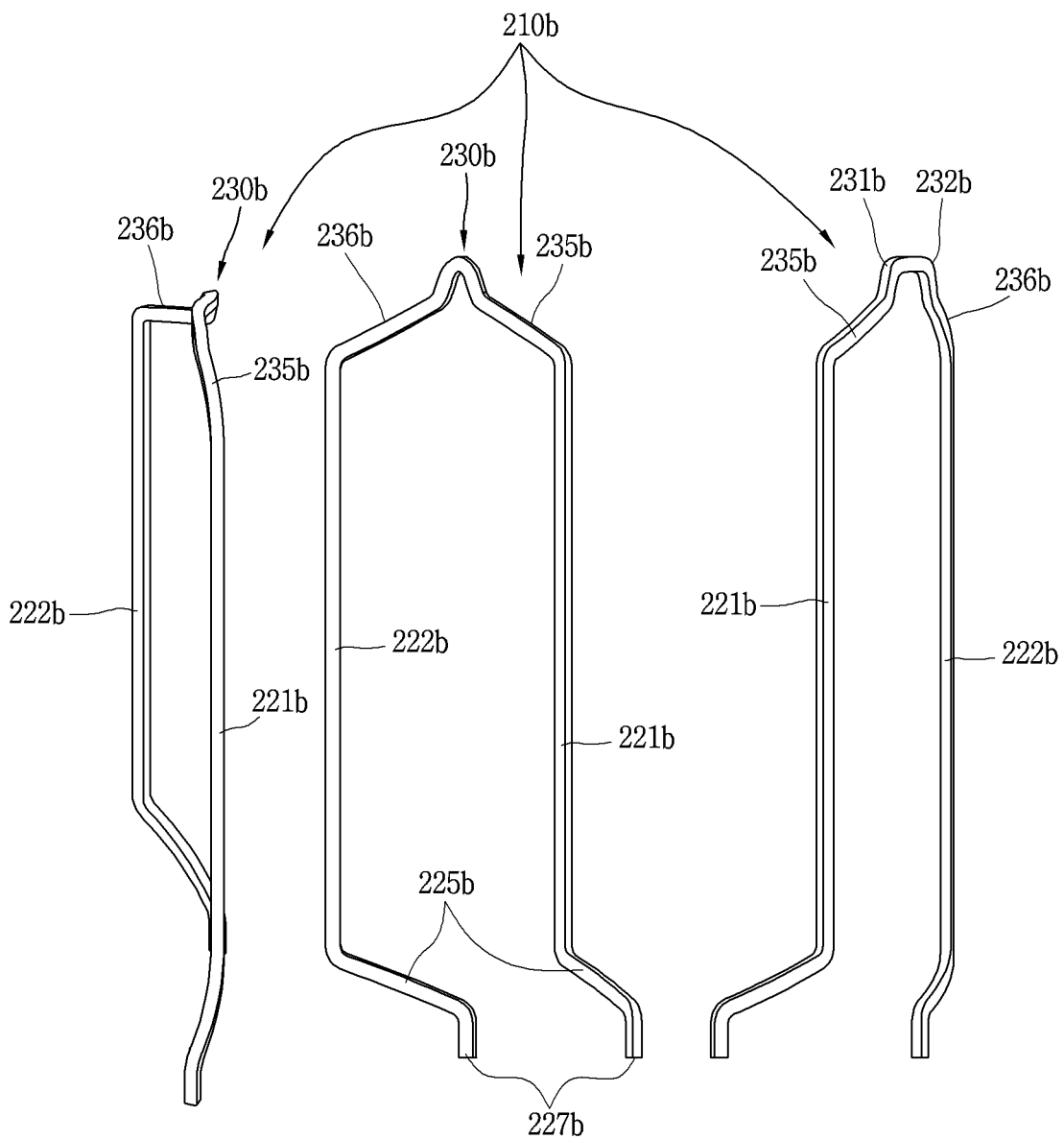
FIG. 10A is a perspective view of a second hairpin of FIG. 3.
FIG. 10B is another perspective view of the second hairpin of FIG. 3.
FIG. 10C is another perspective view of the second hairpin of FIG. 3.

As shown in FIGS. 10A-10C, the second hairpin 210b is implemented in a roughly reverse "U" shape by including a pair of insertion parts 220b capable of being inserted into different slots 114 and a connection part 230b configured to connect the insertion parts 220b.

The pair of insertion parts 220b has a first insertion part 221b and a second insertion part 222b spaced a predetermined distance apart from the first insertion part 221b. The first insertion part 221b and the second insertion part 222b are spaced apart from each other at a pitch of 6 slots. In detail, when the first insertion part 221b is inserted into any one of the slots 114 of the stator core 110, the second insertion part 222b is inserted into a sixth slot 114 circumferentially from the slot 114 into which the first insertion part 221b is inserted. That is, when the first insertion part 221b is inserted into a second slot, the second insertion part 222b is inserted into an eighth slot. In this embodiment, the following description will be given in association with the description of the first hairpin 210a. The first insertion part 221b of the second hairpin 210b may be inserted into a third layer 121c of the second clot, and the second insertion part 222b may be inserted into a fifth layer 121e of the eighth slot.

The insertion part 220b has a length sufficient to protrude from the end of the stator core 110 after being inserted into the slot 114 of the stator core 110. A slope extending part 225b obliquely extending to one side (to the right in the drawing) around the circumference of the stator after the insertion part 220b is inserted into the corresponding slot 114 is formed at one end of the insertion part. A connection end portion 227b axially extending and connecting to other hairpins or the like through welding or the like is formed at a distal end of the slope extending part 225b. The connection end portion 227 is bent and placed toward the shaft of the stator core 110.

The connection part 230b includes a first bending part 231b and a second bending part 232b which are bent with a predetermined minimum radius of curvature so that the pair of insertion parts 220b may be radially inserted into different layers inside the slot 114. The first hairpin 210a includes a first connection section 235b connecting the first insertion part 221b and the first bending part 231b and a second connection section 236b connecting the second bending part 232b and the second insertion part 222b.

The first bending part 231b and the second bending part 232b of the second hairpin 210b have the minimum radius of curvature. The minimum radius of curvature of each of the first bending part 231b and the second bending part 232b is smaller than the maximum width of the cross section of the hairpin 210.

The minimum radius of curvature of each of the first bending part 231b and the second bending part 232b is, for example, 2 mm to 3 mm. Accordingly, the first bending part 231b and the second bending part 232b of the second hairpin 210b are bent with the minimum radius of curvature which is significantly small compared to the conventional technique, and thus have a relatively large degree of elastic deformation. Therefore, it is possible to suppress spring-back or the like to quickly and easily perform the bending operation. As shown in FIG. 10B, a first connection section 235b is formed by bending an upper end of the first insertion part 221b upward to the left in the drawing. As shown in FIG. 10C, the first bending part 231b is bent with the minimum radius of curvature from the first connection section 235b to the right in the drawing, and the first bending part 231b is bent at one end with the minimum radius of curvature to the left in the drawing and then bent downward in the drawing to form the second connection section 236b. The second connection section 236b is bent downward at one end and then connected to the second insertion part 222b.

The second hairpin 210b has a predetermined protrusion length from the end of the stator core 110. The second hairpin 210b is configured to have a second protrusion length D2 axially from the end of the stator core 110 after the second hairpin 210b is inserted into, and coupled to, the stator core 110 (see FIGS. 12A-12C). For example, the second protrusion length D2 may be of 29 mm to 31 mm or, in some embodiments, 30 mm. The difference between the first protrusion length D1 of the first hairpin 210a and the second protrusion length D2 of the second hairpin 210b is greater than the width (for example, the maximum width) of the cross section of the hairpin 210. The difference between the first protrusion length D1 and the second protrusion length D2 may be, for example, 1.3 to 1.7 times the maximum width of the cross section of the hairpin 210. In detail, for example, the difference between the first protrusion length D1 and the second protrusion length D2 may be 5 mm. That is, the first bending part 231b and the second bending part 232b of the first hairpin 210a may be spaced 5 mm apart from the first bending part 231b and the second bending part 232b of the second hairpin 210b, respectively.

Figures 11A, 11B, 11C:
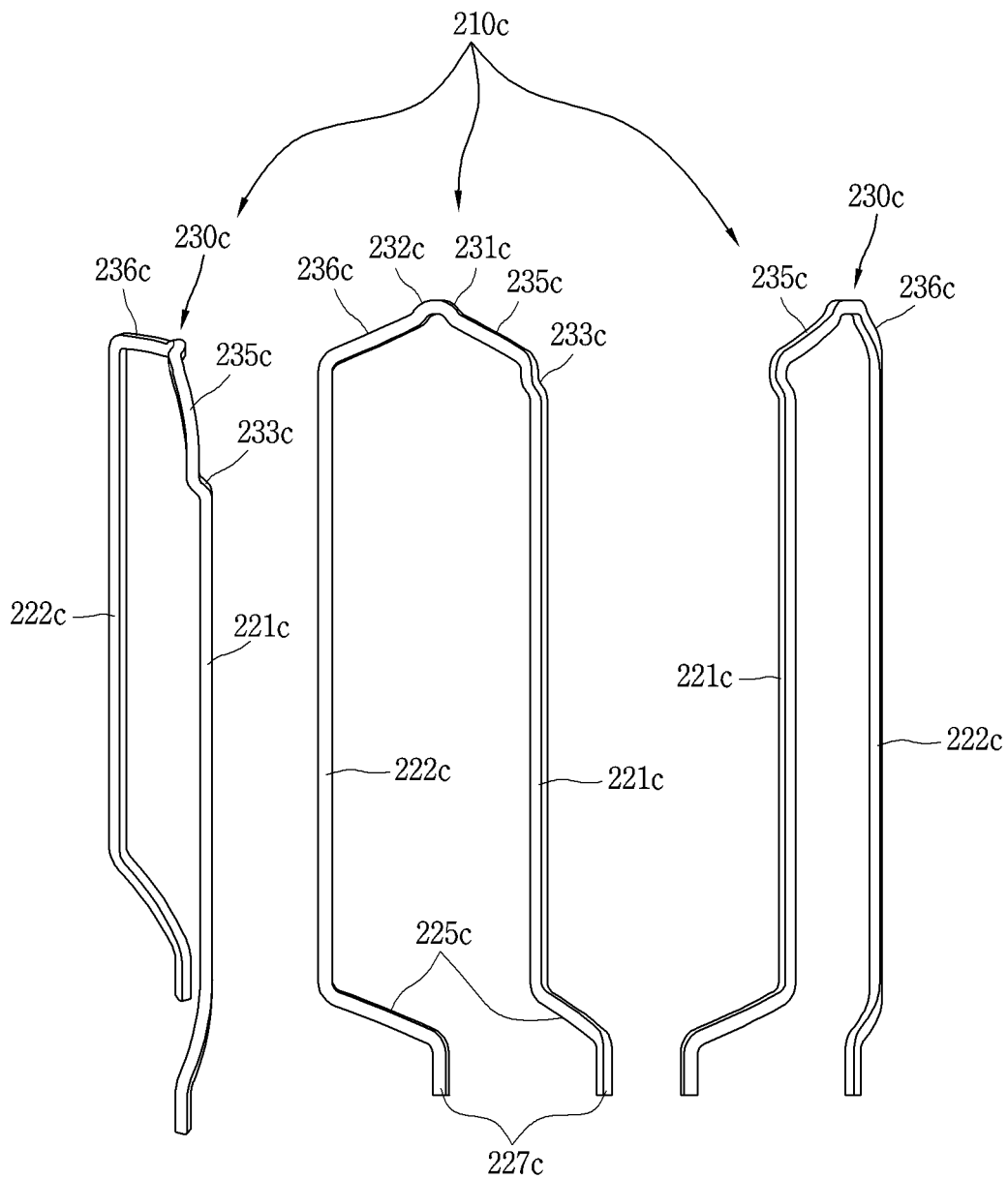
FIG. 11A is a perspective view of a third hairpin of FIG. 3.
FIG. 11B is another perspective view of the third hairpin of FIG. 3.
FIG. 11C is another perspective view of the third hairpin of FIG. 3.

As shown in FIGS. 11A-11C, the third hairpin 210c includes a first insertion part 221c and a second insertion part 222c in first layers 121a inside different slots 114 of the stator core 110. The third hairpin 210c has a connection part 230c configured to connect the first insertion part 221c and the second insertion part 222c. The first insertion part 221c and the second insertion part 222c of the third hairpin 210c are spaced apart from each other at a pitch of 6 slots.

The connection part 230c of the third hairpin 210c is formed to suppress interference when such adjacent third hairpin 210c cross each other. The connection part 230c of the third hairpin 210c has a first bending part 231c and a second bending part 232c such that the crossing is possible. The connection part 230c has a first connection section 235c connecting the first bending part 231c and the first insertion part 221c and a second connection section 236c connecting the second bending part 232c and the second insertion part 222c.

A third bending part 233c is provided in a boundary region between the first insertion part 221c and the connection part 230c of the third hairpin 210c. In detail, the third bending part 233c is formed in a boundary region between the first insertion part 221c and the first connection section 235c. Thus, the first connection section 235c of the third hairpin 210c further protrudes to the inside of the stator core 110 than the first layer 121a of the stator core 110 by the third bending part 233c, and the second connection section 236c is placed on an upper side of the first layer 121a of the stator core 110.

Meanwhile, the third hairpin 210c is configured such that the third hairpin 210c of the first phase-specific coil part of each phase-specific coil part 152 is placed adjacent to each other and crosses each other. As a result, the first bending part 231c and the second bending part 232c of the third hairpin 210c do not generate a potential difference when the two parts cross each other. Accordingly, there is no possibility that a partial discharge will occur through a damaged region of a film 214 even though the film 214 is damaged while the first bending part 231c, the second bending part 232c, and the third bending part 233c are bent.

The third hairpin 210c has a predetermined third protrusion length D3 such that the third hairpin 210c may protrudes axially from the end of the stator core 110 (see FIG. 14). For example, the third protrusion length D3 may be set to 26 mm to 28 mm or, in some embodiments, 27 mm. In detail, the third hairpin 210c may have a protrusion length that is 2 mm longer than that of the first hairpin 210a and that is 3 mm shorter than that of the second hairpin 210b. According to such a configuration, by axially spacing the third hairpin 210c apart from other hairpins 210a and 210b in the vicinity when the third hairpin 210c is assembled, it is possible to suppress interference in a horizontal direction (an axial transverse direction). As a result, it is possible to quickly and easily assemble the third hairpin 210c.

Figures 12A, 12B, 12C:
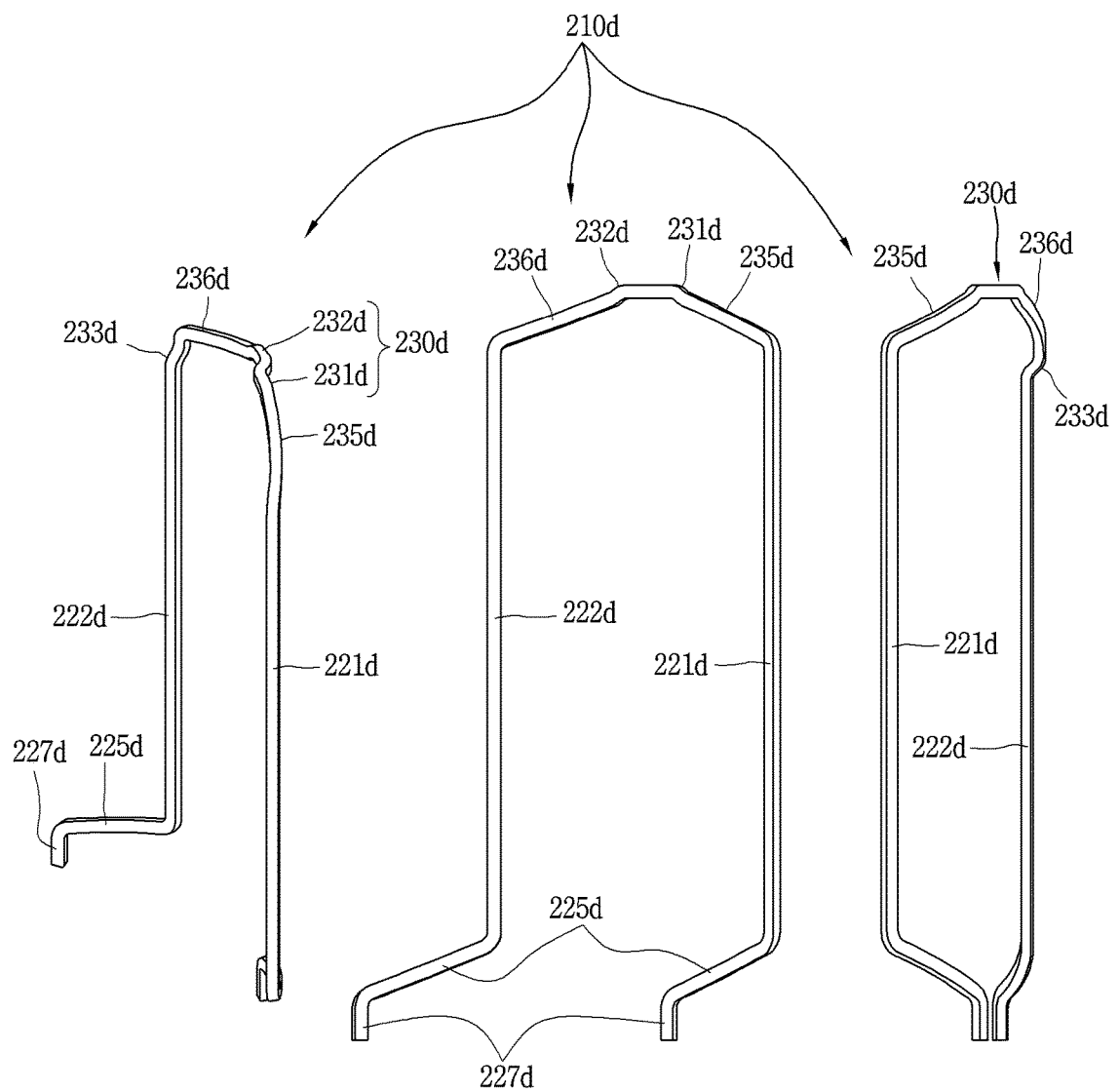
FIG. 12A is a perspective view of a fourth hairpin of FIG. 3.
FIG. 12B is another perspective view of the fourth hairpin of FIG. 3.
FIG. 12C is another perspective view of the fourth hairpin of FIG. 3.

As shown in FIGS. 12A-12C, the fourth hairpin 210d has a first insertion part 221d and a second insertion part 222d configured to be inserted into sixth layers 121f of different slots 114 of the stator core 110. The fourth hairpin 210d has a connection part 230d configured to connect the first insertion part 221d and the second insertion part 222d. The connection part 230d of the fourth hairpin 210d has a first bending part 231d and a second bending part 232d such that such adjacent fourth hairpins 210d may cross each other. The fourth hairpin 210d includes a first connection section 235d connecting the first insertion part 221d and the first bending part 231d and a second connection section 236d connecting the second bending part 232d and the second insertion part 222d. The connection part 230d of the fourth hairpin 210d has a third bending part 233d bent to protrude outward radially with respect to the stator core 110 on an upper side of the second insertion part 222d. The fourth hairpin 210d is moved along an upper side of the sixth layer 121f of the slot 114 of the stator core 110, is further moved outward than the sixth layer 121f by the first bending part 231d and the second bending part 232d, and is moved back to the upper side of the sixth layer 121f by the third bending part 233d and connected to the second insertion part 222d.

The fourth hairpin 210d has a predetermined third protrusion length D3 such that the fourth hairpin 210d may protrude from the end of the stator core 110 (see FIG. 14). For example, the third protrusion length D3 may be set to 26 mm to 28 mm or, in some embodiments, 27 mm.

Figures 13A, 13B, 13C:
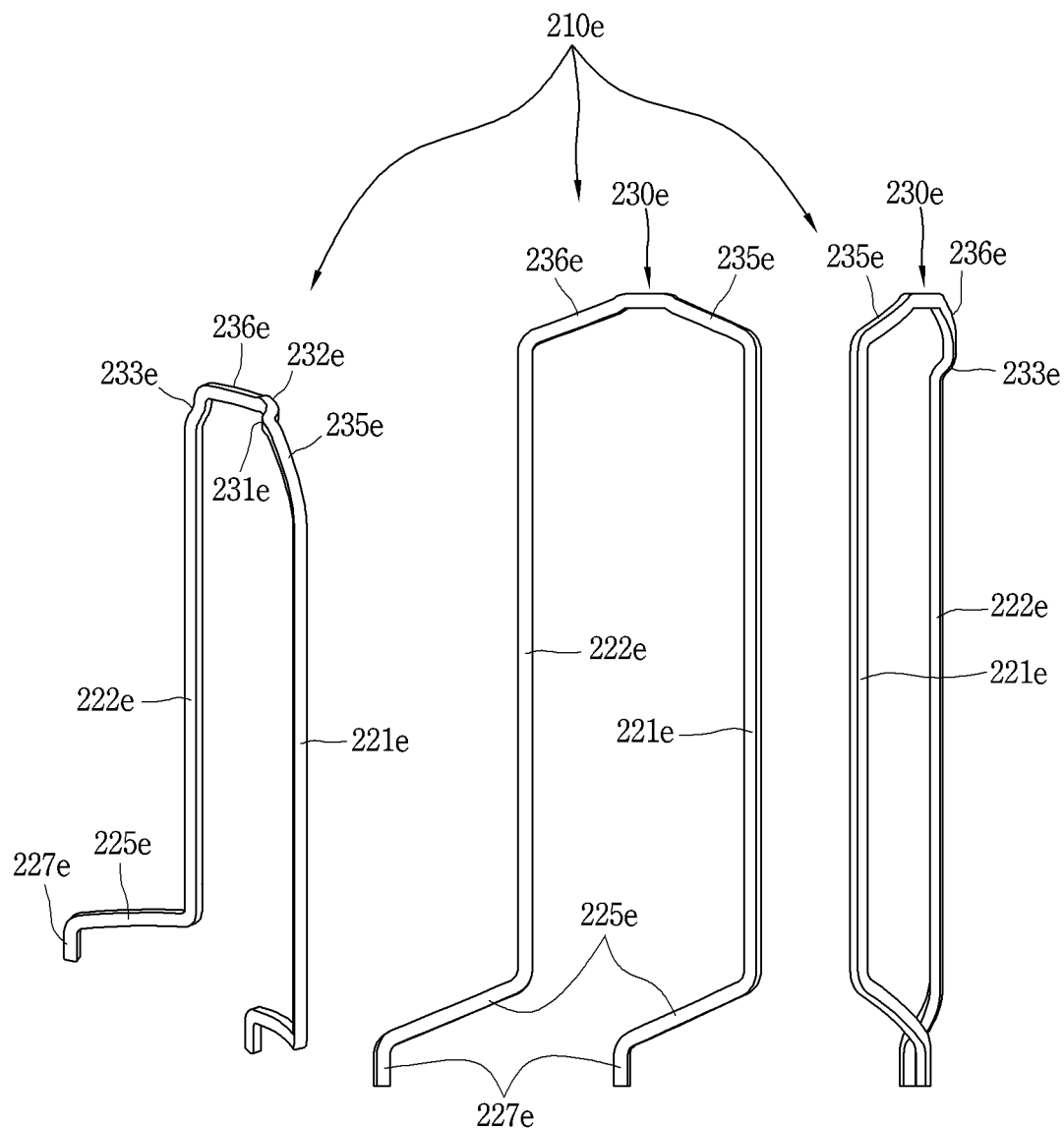
FIG. 13A is a perspective view of a fifth hairpin of FIG. 3.
FIG. 13B is another perspective view of the fifth hairpin of FIG. 3.
FIG. 13C is another perspective view of the fifth hairpin of FIG. 3.

As shown in FIGS. 13A-13C, the fifth hairpin 210e has a first insertion part 221e and a second insertion part 222e configured to be inserted into sixth layers 121f of different slots 114 of the stator core 110. The fifth hairpin 210e has a connection part 230e configured to connect the first insertion part 221e and the second insertion part 222e. The connection part 230e of the fifth hairpin 210e has a first bending part 231e and a second bending part 232e such that such adjacent fifth hairpins 210e may cross each other. The first insertion part 221d and the second insertion part 222e of the fifth hairpin 210e are spaced apart from each other at a pitch of 5 slots.

The connection part 230e of the fifth hairpin 210e includes a first connection section 235e connecting the first insertion part 221e and the first bending part 231e and a second connection section 236e connecting the second bending part 232e and the second insertion part 222e. The connection part 230e of the fifth hairpin 210e has a third bending part 233e bent such that the second connection section 236e may protrude to the outside of the sixth layer 121f.

The fifth hairpin 210e has a predetermined fourth protrusion length D4 such that the fifth hairpin 210e may protrude from the end of the stator core 110 (see FIG. 14). The fourth protrusion length D4 is smaller than the third protrusion length D3. The fifth hairpin 210e may be placed on an inner side of the fourth hairpin 210d. For example, the fourth protrusion length D4 may be equal to the third protrusion length D3 minus the thickness (width) of the hairpin 210 (e.g., 2.84 mm) and an assembly tolerance. For example, the fourth protrusion length D4 may be of 23 mm to 25 mm or, in some embodiments, 24 mm. The fifth hairpin 210e is connected to the same phase of the power source even when the fifth hairpin 210e is placed on the inner side of the fourth hairpin 210d. Thus, since there is no inter-phase potential difference, there is no possibility that a partial discharge will occur.

Figure 15:
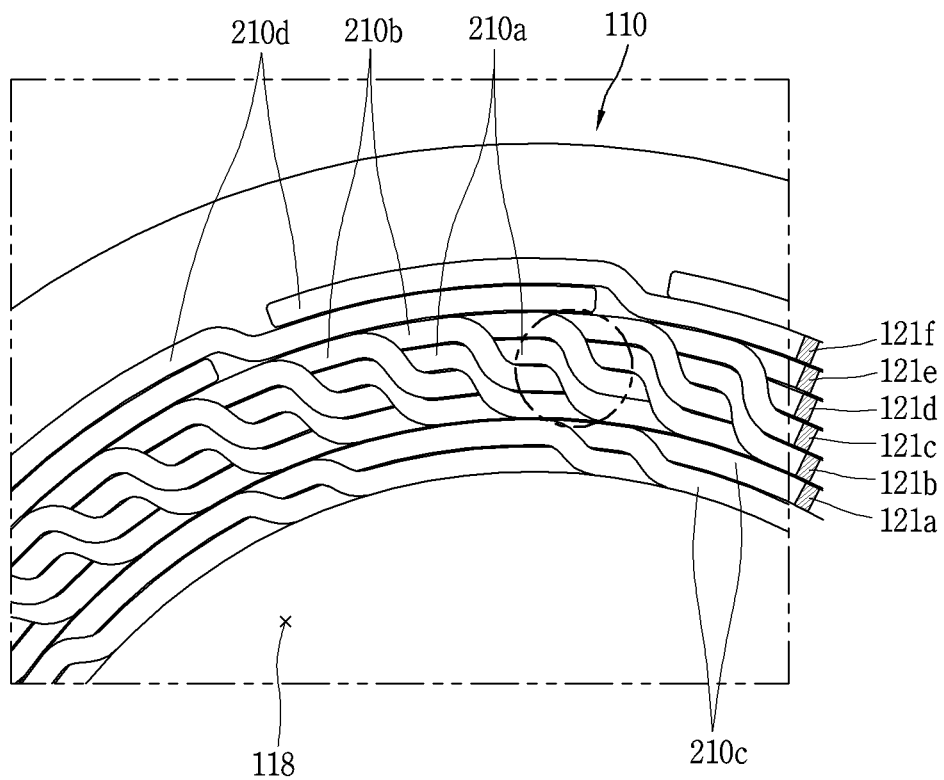
FIG. 15 is a plan view of the region where the first hairpin and the second hairpin of FIG. 14 cross each other.
Figure 16:
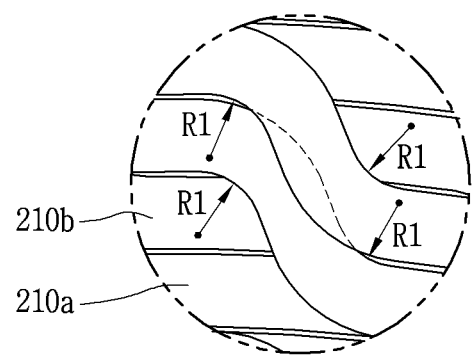
FIG. 16 is an enlarged view showing a first bending part and a second bending part of the second hairpin of FIG. 15.
Figure 17:
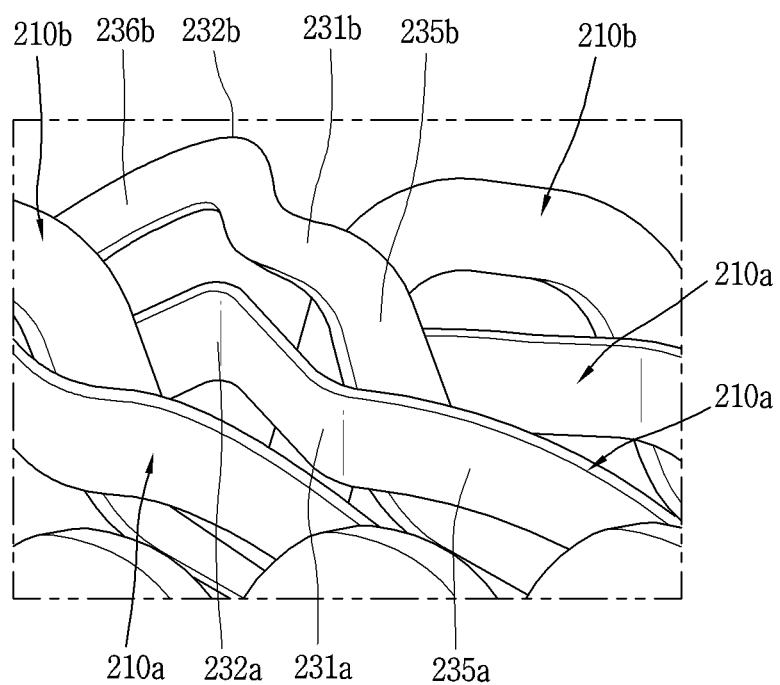
FIG. 17 is an enlarged perspective view of the first bending part and the second bending part of each of the first hairpin and the second hairpin of FIG. 16.

FIG. 14 is a sectional view of a region where the first hairpin and the second hairpin of FIG. 5 cross each other, FIG. 15 is a plan view of the region where the first hairpin and the second hairpin of FIG. 14 cross each other, FIG. 16 is an enlarged view showing a first bending part and a second bending part of the second hairpin of FIG. 15, and FIG. 17 is an enlarged perspective view of the first bending part and the second bending part of each of the first hairpin and the second hairpin of FIG. 16. As described above and as shown in FIG. 14, the first hairpin 210a, the second hairpin 210b, the third hairpin 210c, the fourth hairpin 210d, and the fifth hairpin 210e are inserted into the slot 114 of the stator core 110.

The first hairpin 210a, the second hairpin 210b, the third hairpin 210c, the fourth hairpin 210d, and the fifth hairpin 210e protrude axially from the end of the stator by a first protrusion length D1, a second protrusion length D2, a third protrusion length D3, and a fourth protrusion length D4, which are predetermined and different from each other. As a result, the first hairpin 210a, the second hairpin 210b, the third hairpin 210c, the fourth hairpin 210d, and the fifth hairpin 210e have axially different protrusion lengths during the assembling. Thus, since interference is suppressed in a horizontal direction (an axial transverse direction), it is possible to quickly and easily perform the assembling. For convenience of description, when it is assumed that the first insertion part 221a of the first hairpin 210a is inserted into the second layer 121b of the first slot, the second insertion part 222a of the first hairpin 210a is inserted into the fourth layer 121d of the seventh slot. The first insertion part 221b of the second hairpin 210b may be inserted into the third layer 121c of the second slot, and the second insertion part 222b of the second hairpin 210b may be inserted into the fifth layer 121e of the eighth slot. Thus, the first hairpin 210a and the second hairpin 210b may cross each other in some regions.

Even though a film is damaged when the first bending part 231b and the second bending part 232b of the second hairpin 210b are bent (formed) as shown in FIGS. 15 to 17, the first bending part 231a and the second bending part 232a of the first hairpin 210a are vertically spaced a predetermined distance (e.g., 5 mm) apart from each other. Accordingly, even when the first hairpin 210a and the second hairpin 210b are connected to different phases of a power source such that an inter-phases potential difference is generated, the possibility of occurrence of the partial discharge can be remarkably reduced.

Also, as shown in FIG. 16, the first bending part 231a and the second bending part 232a of the first hairpin 210a overlap each other circumferentially with respect to the stator core 110 while the first bending part 231a and the second bending part 232a are partially spaced apart from each other in the vertical direction on lower sides of the first bending part 231b and the second bending part 232b of the second hairpin 210b. As a result, it is possible to maximize the bending curvature (the minimum radius of curvature) of the first bending parts 231a and 231b and the second bending parts 232a and 232b of the first hairpin 210a and the second hairpin 210b and thus quickly and easily perform the bending operation of the first bending parts 231a and 231b and the second bending parts 232a and 232b. Also, mutual interference is suppressed when the first hairpin 210a and the second hairpin 210b are inserted into the slot 114, and thus it is possible to quickly and easily insert the first hairpin 210a and the second hairpin 210b into the slot 114.

Also, the first bending part 231a and the second bending part 232a of the first hairpin 210a are placed adjacent to the first connection section 235b of the second hairpin 210b as shown in FIG. 15, and the first connection section 235b of the second hairpin 210b has a relatively large radius of curvature (is almost linear). Accordingly, since there is relatively little damage to the films 214, it is possible to significantly reduce the possibility of the partial discharge due to the damage to the films 214 of the first bending part 231a and the second bending part 232a of the first hairpin 210a.

With such a configuration, the first hairpin 210a, the second hairpin 210b, the third hairpin 210c, the fourth hairpin 210d, and the fifth hairpin 210e are formed by bending a conductor cut to a predetermined length. The first hairpin 210a and the second hairpin 210b are formed to have the first bending parts 231a and 231b and the second bending parts 232a and 232b which are bent with a predetermined minimum radius of curvature. The first hairpin 210a, the second hairpin 210b, the third hairpin 210c, the fourth hairpin 210d, and the fifth hairpin 210e are configured to have predetermined protrusion lengths axially from the end of the stator core 110.

When the first hairpin 210a to the fifth hairpin 210e are formed, the first hairpin 210a is inserted into, and coupled to, the first layer 121a of the slot 114 of the stator core 110, and the second hairpin 210b is coupled to the second layer 121b and the fourth layer 121d of each slot 114 of the stator core 110. In this case, the first hairpin 210a and the second hairpin 210b have a first protrusion length D1 and a second protrusion length D2, which are different from each other, respectively, and thus the first hairpin 210a and the second hairpin 210b are axially spaced apart from each other. Accordingly, the occurrence of mutual interference can be suppressed, and it is possible to quickly and easily perform assembly work. The third hairpin 210c is coupled to the third layer 121c and the fifth layer 121e of each slot 114 of the stator core 110, and the fourth hairpin 210d and the fifth hairpin 210e are coupled to the sixth layer 121f of each slot 114 of the stator core 110.

When the first hairpin 210a to the fifth hairpin 210e are coupled to each slot 114 of the stator core 110, the hairpins 210 at predetermined positions are electrically connected to one another according to a predetermined pattern to form the phase-specific coil parts 152. The phase-specific coil parts 152 have one sides connected to the power input parts 155 and the other sides connected to the neutral line 170. A rotor (not shown) that rotates about a rotation axis may be coupled into the stator core 110.

When power is applied to the phase-specific coil parts 152 through the power input parts 155, the first bending parts 131a and 131b and the second bending parts 132a and 132b of the first hairpin 210a and the second hairpin 210b are axially spaced apart from each other, it is possible to significantly suppress occurrence of partial discharge induced by film damage even when an inter-phase potential difference is generated.

Figure 24:
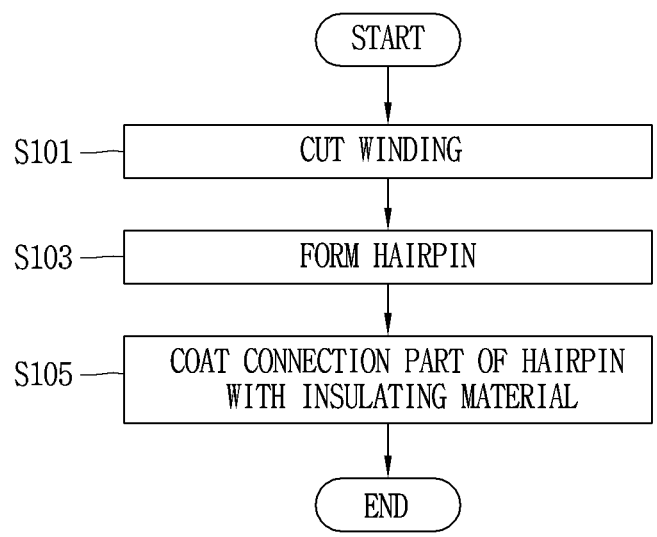
FIG. 24 is a flowchart showing a method of manufacturing a hairpin according to an embodiment of the present disclosure.

Another embodiment of the present disclosure will be described in detail below with reference to FIGS. 2, 18, and 24.

Figure 18:
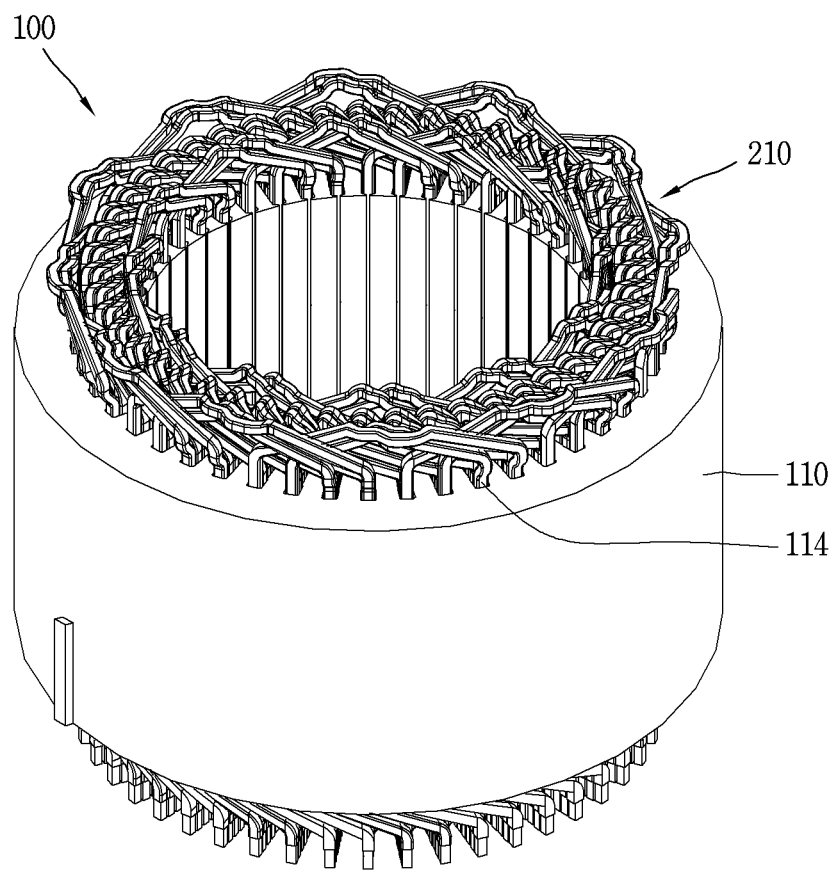
FIG. 18 is a perspective view of a stator into which a hairpin is inserted according to an embodiment of the present disclosure.
Figure 19:
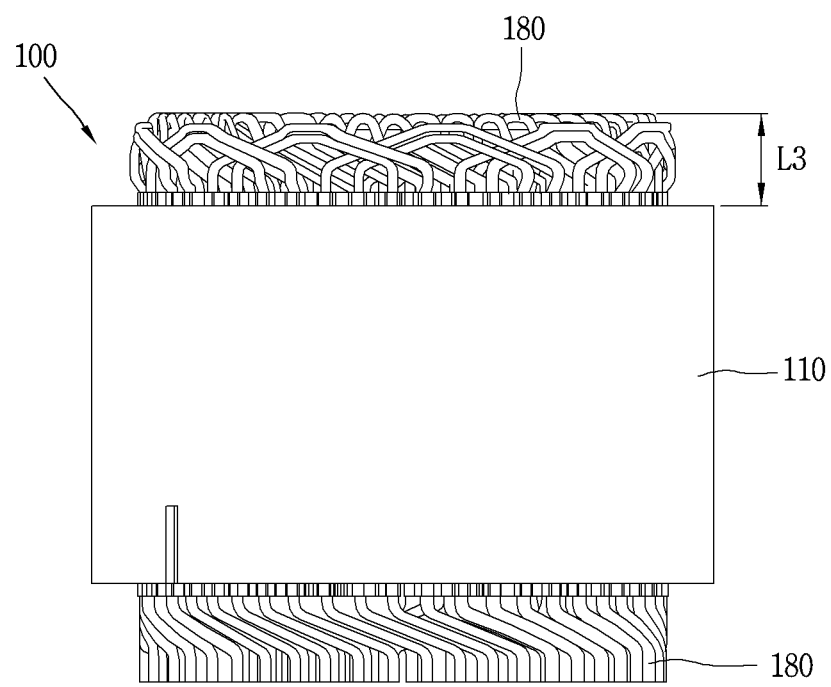
FIG. 19 is a side view of showing a stator into which a hairpin is inserted according to an embodiment of the present disclosure.

FIG. 2 is a perspective view of a motor with a hairpin according to an embodiment of the present disclosure, FIG. 18 is a perspective view of a stator into which a hairpin is inserted according to an embodiment of the present disclosure, and FIG. 19 is a side view of a stator into which a hairpin is inserted according to an embodiment of the present disclosure.

A motor 50 having a hairpin 210 according to an embodiment of the present disclosure may include a housing 60, a stator 100, and a rotor (not shown).

The stator 100 may include a stator core 110 and a stator coil 150. The stator core 110 has slots 114 and teeth 116, as described above. The stator coil 150 is configured by connecting a plurality of hairpins 210 to be inserted into the slots 114 of the stator core 110 in a predetermined pattern.

The slots 114 are radially formed on the stator core 110, and the multiple hairpins 210, which will be described later, are inserted into the slots 114 to cross one another. When the hairpins 210 are inserted into the slots 114, both sides of the hairpins 210 protrude from both sides of the stator 100 to form an end coil 180.

For example, the hairpins 210 may be manufactured by cutting a winding 211 to the same length or different lengths and then performing a U-bending process and may be axially inserted into the slots 114 of the stator core 110 at a certain phase. Ends (connection ends 227) of the hairpins 210 protruding outwardly from the stator core 110 may be wired to and then connected to one another through welding.

A curved connection part 230 is performed in each hairpin 210 through the U-bending process. In detail, each hairpin 210 has a pair of insertion parts 220 to be inserted into the slot 114 and a connection part 230 for connecting the pair of insertion parts 220. When the plurality of hairpins 210 are inserted into the slots 114 to cross one another, the connection parts 230 are located adjacent to one another. Such a connection part 230 has a first bending part 231 and a second bending part 232, as described above.

In the conventional case, the connection part 230 has a damaged portion, e.g., a crack because an insulating film is damaged during the U-bending process for the hairpin 210. As a result, insulation performance of the hairpin 210 is degraded, and an initial voltage for partial discharge is lowered. Thus, partial discharge occurs even at a low voltage.

The initial voltage for partial discharge is mainly lowered through a process of forming the hairpins 210 and partial discharge starting voltage is mainly lowered through a hairpin (for example, hairpin 210) forming process and a vehicle driving process. By performing a bending process and a pressing process while forming a coil such as the hairpins 210, the initial voltage for partial discharge is lowered by about 35% compared to the conventional case.

However, according to the present disclosure, by coating the connection part 230 with a damaged portion generated in the U-bending process, which is a main cause of lowering the initial voltage for partial discharge, with an insulating liquid 310 such as a synthetic resin, the damaged portion generated during the hairpin forming process may be supplemented. Thus, it is possible to prevent degradation of insulation performance and also to prevent partial discharge at a low voltage.

In this embodiment, the connection part 230 is coated with an insulating liquid 310 such as a synthetic resin to improve the insulation performance. However, this is an example, and the present disclosure is not limited thereto.

For example, by inserting an insulator (not shown) between connection parts 230 adjacent to each other when multiple hairpins 210 are inserted into slots 114, it is possible to additionally improve the insulation performance of the hairpin 210 and also to adjust the insulation performance by adjusting the thickness of a film formed through the coating.

The hairpin manufacturing process according to an embodiment of the present disclosure will be described in detail below with reference to FIGS. 20 to 24.

Figure 20:
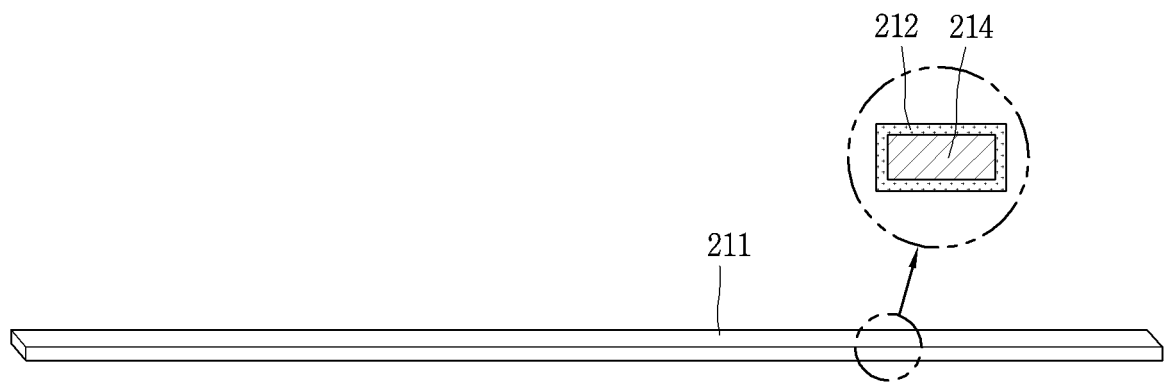
FIG. 20 is a perspective view showing that a magnet wire is cut according to an embodiment of the present disclosure.

First, as shown in FIG. 20, a winding 211 wound around a bobbin is released and then cut to a predetermined length (S101).

Here, the winding 211 has a conductor 212 and a film 214 formed of an insulating member to surround the surface of the conductor 212.

The winding 211 may have a rectangular cross-sectional shape. By forming the cross-section of the winding 211 in a rectangular shape, it is possible to improve the space factor of the winding 211.

In this embodiment, the cross section of the winding 211 is formed in a rectangular shape. However, this is an example, and the present disclosure is not limited thereto.

For example, the winding 211 may have a circular cross-section, and the space factor of the winding 211 may be adjusted by adjusting the diameter of the winding 211.

Also, the space factor of the winding 211 may be adjusted by reducing the thickness of the film that coats copper or aluminum forming the winding 211.

Figure 21:
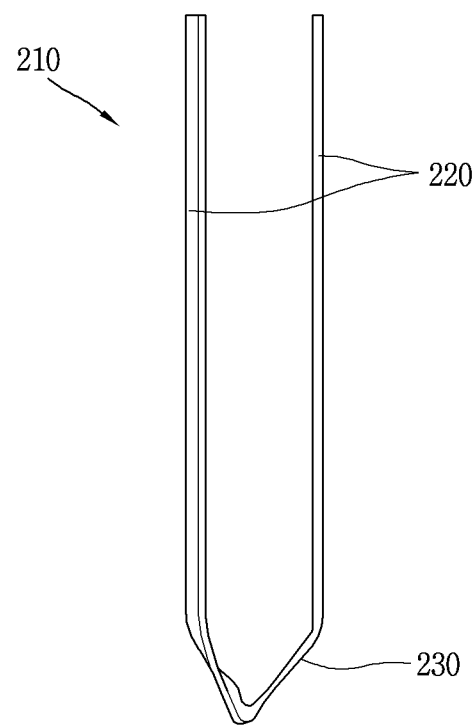
FIG. 21 is a perspective view showing that the magnet wire of FIG. 20 is formed as a hairpin.

Subsequently, as shown in FIG. 21, the U-bending process is performed on the winding 211 using a jig mold. Through the U-bending process, the hairpin 210 having the pair of insertion parts 220 to be inserted into the slots 114 of the stator core 110 and the connection part for connecting the insertion parts 220 is formed (S103). As described with reference to FIGS. 9A-9C to 13A-13C, and as shown in FIGS. 13A-13C, the insertion parts 220 have a first insertion part 221 and a second insertion part 222, and the connection part has a first bending part 231, a second bending part 232, a first connection section 235 for connecting the first bending part 231 and the first insertion part 221, and a second connection section 236 for connecting the second bending part 232 and the second insertion part 222. As described above, the hairpin 210 includes a first hairpin 210a, a second hairpin 210b, a third hairpin 210c, a fourth hairpin 210d, and a fifth hairpin 210e which are roughly similar in appearance but are formed to have different shapes according to their insertion positions.

Figure 22:
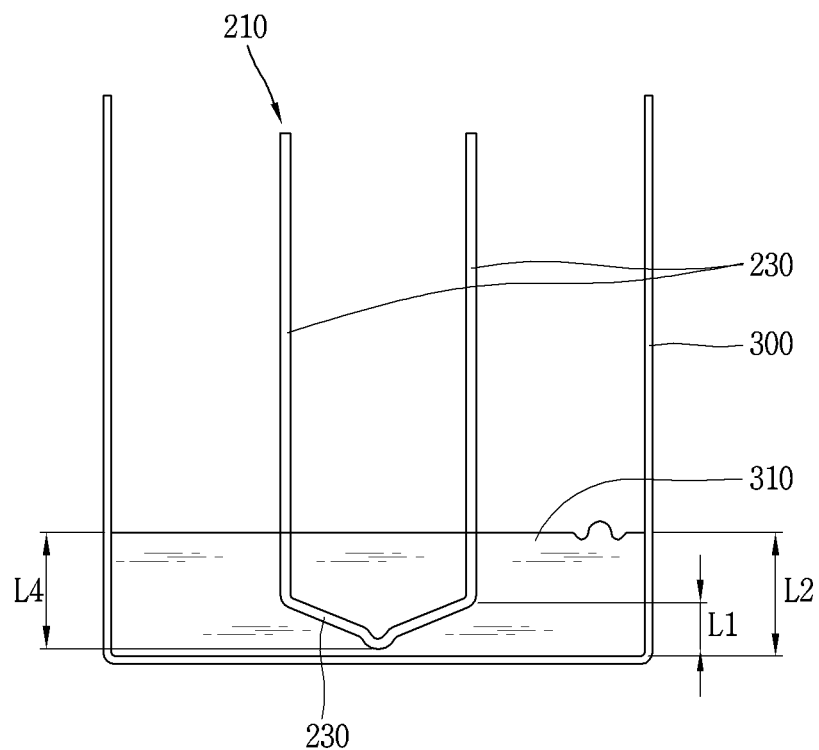
FIG. 22 is an exemplary view showing that the hairpin of FIG. 21 is coated by being immersed in an insulating liquid.

Here, as shown in FIG. 22, the connection part 230 formed in the hairpin 210 is additionally coated by putting the connection part 230 into a coating bath 300 containing an insulating liquid 310 (S105).

The connection part 230 has a damaged portion in which an insulating film is damaged while the hairpin 210 is formed using the winding 211, and thus insulating performance of the damaged portion is degraded. However, the damaged portion is supplemented and treated by re-coating the connection part 230 with the insulating liquid 310.

Here, the connection part 230 of the hairpin 210 may be coated through dip coating, which is a process of putting the connection part 230 into the insulating liquid 310 and taking the connection part 230 out of the insulating liquid 310.

In addition, the insulating liquid 310 may be formed of a synthetic resin, in particular, a soft synthetic resin.

One or more of an epoxy resin, a Teflon resin, a fluoro resin, a polyethylene resin, a polypropylene resin, a nylon resin, and a polyvinyl chloride (PVC) resin may be used as the soft synthetic resin.

The height L2 of the insulating liquid in the coating bath 300 may be greater than or equal to the length L1 of the connection part 230.

For example, when the connection part 230 is immersed in the insulating liquid 310 filling the coating bath 300 and the length L1 of the connection part 230 is greater than or equal to the height L2 of the insulating liquid 310 in the coating bath 300, a portion of the connection part 230 is not further coated through the insulating liquid 310. When the uncoated portion has a film-damaged portion, it is not possible to improve the insulation performance of the hairpin 210.

On the contrary, when the length L1 of the connection part 230 is less than or equal to the height of the insulating liquid 310 inside the coating bath 300 and the connection part 230 is immersed in the insulating liquid 310, the entirety of the connection part 230 may be sufficiently coated with the insulating liquid 310. Thus, it is possible to improve the insulation performance of the hairpin 210.

Figure 23:
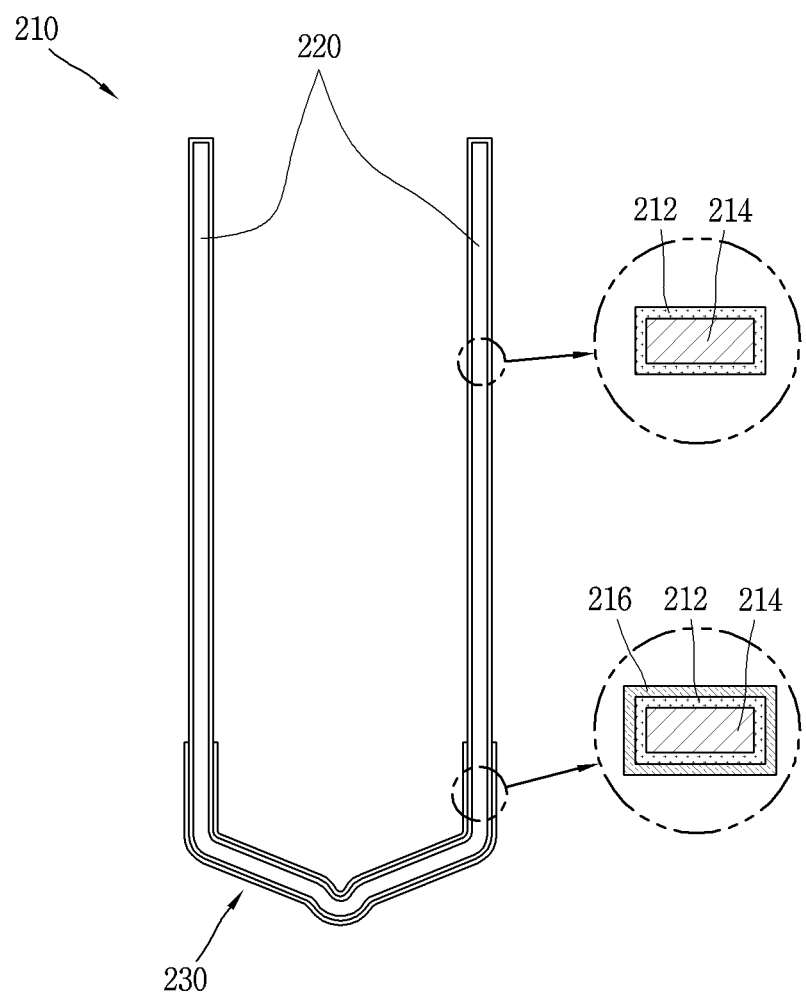
FIG. 23 is a longitudinal sectional view of the hairpin of FIG. 22.

In addition, the height L2 of the insulating liquid 310 may be less than or equal to the length L3 of the end coil 180. As shown in FIG. 23, the hairpin 210 has a pair of insertion parts 220 and a connection part 230 and is formed in a roughly "U" shape. The hairpin 210 has a conductor 212 and a film formed of an insulating material to surround an external surface of the conductor 212. The hairpin 210 has a coated part 216 formed by immersing the connection part 230 in the insulating liquid 310. The coated part 216 is formed to surround the circumference of the connection part 230. The coated part 216 may be formed to include the connection part 230 and a boundary region between the connection part 230 and the pair of insertion parts 220. In this embodiment, the thicknesses of the film 214 and the coated part 216 are exaggerated to be greater than the actual thicknesses thereof for the sake of convenience of description. However, actually, the film 214 and the coated part 216 may be formed to be significantly thinner than the conductor 212.

In detail, when the multiple hairpins 210 are inserted into the slots 114 formed in the stator core 110, some of the hairpins 210 may be located to protrude outwardly from the stator core 110 and may form the end coil 180.

In this case, the curved connection part 230 of the hairpin 210 forms a portion of the end coil 180.

Here, when the height L2 of the insulating liquid 310 is greater than the length L3 of the end coil 180, the connection part 230 and another portion of the hairpin 210 are coated with the insulating liquid 310, and a portion L4 of the hairpin 210 coated with the insulating liquid 310, the length L4 of the coated part 216 is greater than the length L3 of the end coil 180. That is, the coated part 216 is formed to include the connection part 230 and also include a predetermined section of the pair of insertion parts 220.

Accordingly, when the hairpins 210 are inserted into the slots formed in the stator core 110, the connection part 230 of the coated portion L4 protrudes outwardly from the stator core 110 to form the end coil 180, and the coated other portion (the coated portion of the pair of insertion parts 220) is inserted into the slots.

In this case, since the coated portion L4 (the coated part 216) to be inserted into the slot 114 has a film with a large thickness, it is difficult for the coated portion to be inserted into the slot 114. Thus, it is difficult for the hairpin 210 to be inserted into or separated from the slot 114.

On the contrary, when the height L2 of the insulating liquid 310 is less than or equal to the length L3 of the end coil 250, the coated portion L4 (the coated part 216) coated with the insulating liquid 310 is shorter than the length L3 of the end coil 180.

In this case, when the hairpin 210 is inserted into the slot 114 formed in the stator core 110, the coated portion L4 is entirely exposed outwardly from the stator core 110 to form the end coil 180, and the coated portion L4 to be inserted into the slot 114 is not present.

Accordingly, when the hairpin 210 is inserted into the slot 114, the insertion of the hairpin 210 into the slot 114 is not disturbed due to the thick insulating film of the coated portion L4. This can make it easier for the hairpin 210 to be inserted into or separated from the slot 114.

With the manufacturing process according to the present disclosure, by further coating the connection part 230 of the hairpin 210 with the insulating liquid 310 such as a synthetic resin, the film damaged during the formation of the hairpin 210 is supplemented to prevent degradation of the insulation performance of the hairpin 210.

Also, when the hairpin 210 is coupled to the slot, the coated part 216 additionally formed at the connection part 230, which is a crossing point, can significantly improve the insulation performance at the crossing point that needs inter-phase insulation.

Also, since the connection part 230 of the hairpin 210 is additionally coated with the insulating liquid 310, the thickness of the film of the connection part 230 increases. Accordingly, when the hairpin 210 is inserted into the slot 114 of the stator 100, such hairpins 210 located adjacent to each other are sufficiently spaced apart from each other, and thus it is possible to prevent the initial voltage for partial discharge from being lowered.

Also, by maintaining the height L2 of the insulating liquid 310 in the coating bath 300 to be greater than that of the connection part 230 when the connection part 230 is immersed in the insulating liquid 310, the entirety of the connection part 230 is sufficiently coated with the insulating liquid 310.

Also, by setting the height L2 of the insulating liquid 310 in the coating bath 300 to be less than or equal to the length L3 of the end coil, the additionally coated portion L4 is all exposed outwardly from the stator 100 when the hairpin 210 is inserted into the slot 114 of the stator 100. Therefore, it is possible to prevent the coated portion L4 (the coated part 216) from being inserted into the slot 114 and also to prevent the hairpin 210 from being hindered from being coupled to the slot 114 due to the thick film of the coated portion L4.

In the foregoing, exemplary embodiments of the present disclosure have been shown and described. However, the present disclosure may be embodied in various forms without departing from the spirit or essential characteristics thereof, and accordingly, it is intended that the embodiment described above not be limited by the detailed description provided herein.

Moreover, even if any embodiment is not specifically disclosed in the foregoing detailed description, it should be broadly construed within the scope of the technical spirit, as defined in the accompanying claims. Furthermore, all modifications and variations included within the technical scope of the claims and their equivalents should be covered by the accompanying claims.

What is claimed is:

1. A stator of an electric rotating machine, the stator comprising:
   a stator core comprising slots and teeth; and
   a stator coil comprising a plurality of hairpins configured to be inserted into the slots of the stator core in a predetermined pattern, wherein:
   each of the plurality of hairpins comprises:
   a conductor,
   a film surrounding the conductor,
   a pair of insertion parts configured to be inserted into different slots, and
   a connection part connecting the insertion parts, the connection part comprising a first bending part and a second bending part, the first and second bending parts being bent with a predetermined radius of curvature such that the pair of insertion parts are radially insertable into different layers inside the slots, and
   the plurality of hairpins include a first hairpin and a second hairpin, the first and second hairpins protruding from one end of the stator core by different protrusion lengths, and each of the first and second hairpins comprising a region configured to cross each other,
   wherein the plurality of hairpins further include a third hairpin comprising a first insertion part and a second insertion part, the first and second insertion parts of the third hairpin being configured to be inserted into a first layer of different slots, and
   wherein a protrusion length of the third hairpin is longer than the protrusion length of the first hairpin and is shorter than the protrusion length of the second hairpin.

2. The stator of claim 1, wherein each of the first and second hairpins further comprises:
   a first insertion part, the first insertion part of the first hairpin being configured to be inserted into a second layer of a corresponding one of the slots, and the first insertion part of the second hairpin being configured to be inserted into a third layer of a slot adjacent to one side of the slot into which the first insertion part of the first hairpin is configured to be inserted, and a second insertion part, the second insertion part of the first hairpin being configured to be inserted into a fourth layer of another slot, and the second insertion part of the second hairpin being configured to be inserted into a fifth layer of a slot adjacent to one side of the slot into which the second insertion part of the first hairpin in configured to be inserted.

3. The stator of claim 2, wherein each of the plurality of hairpins comprises a rectangular cross section, and the radius of curvature of each of the first and second bending parts is smaller than a maximum width of a cross section of the plurality of hairpins.

4. The stator of claim 2, wherein the protrusion length of the second hairpin is greater than the protrusion length of the first hairpin.

5. The stator of claim 4, wherein, each of the first hairpin and the second hairpin comprises a first connection section connecting the first insertion part of the first hairpin and the first insertion part of the second hairpin to the first bending part, and a second connection section connecting the second insertion part of the first hairpin and the second insertion part of the second hairpin to the second bending part, and the first bending part and the second bending part of the first hairpin are disposed on one side of the first connection section of the second hairpin.

6. The stator of claim 5, wherein a boundary region between the first bending part and the second bending part of the second hairpin is configured to partially overlap with a boundary region between the first bending part and the second bending part of the first hairpin along the circumferential direction of the stator core.

7. The stator of claim 4, wherein the first bending part and the second bending part of the first hairpin are spaced a predetermined distance apart from the first bending part and the second bending part of the second hairpin.

8. The stator of claim 1, wherein, the plurality of hairpins further include a fourth hairpin comprising a first insertion part and a second insertion part, the first and second insertions parts of the fourth hairpin being configured to be inserted into a sixth layer of different slots, and a protrusion length of the fourth hairpin is longer than the protrusion length of the first hairpin and shorter than the protrusion length of the second hairpin.

9. The stator of claim 8, wherein the first insertion part and the second insertion part of each of the first, second, and third hairpins comprise an interval equal to a 6-slot pitch, and the first insertion part and the second insertion part of the fourth hairpin comprise an interval equal to a 7-slot pitch.

10. The stator of claim 9, wherein the plurality of hairpins further include a fifth hairpin disposed on an inner side of the fourth hairpin, the fifth hairpin having a first insertion part and a second insertion part configured to be inserted into a sixth layer of different slots.

11. The stator of claim 10, wherein the first insertion part and the second insertion part of the fifth hairpin comprise an interval equal to a 5-slot pitch.

* * * * *